April 5, 1960 F. H. OWENS 2,931,282
CAMERA
Filed Dec. 17, 1952 8 Sheets-Sheet 1

INVENTOR.
Freeman H. Owens
BY

April 5, 1960  F. H. OWENS  2,931,282
CAMERA
Filed Dec. 17, 1952  8 Sheets-Sheet 3

INVENTOR.
Freeman H. Owens
BY

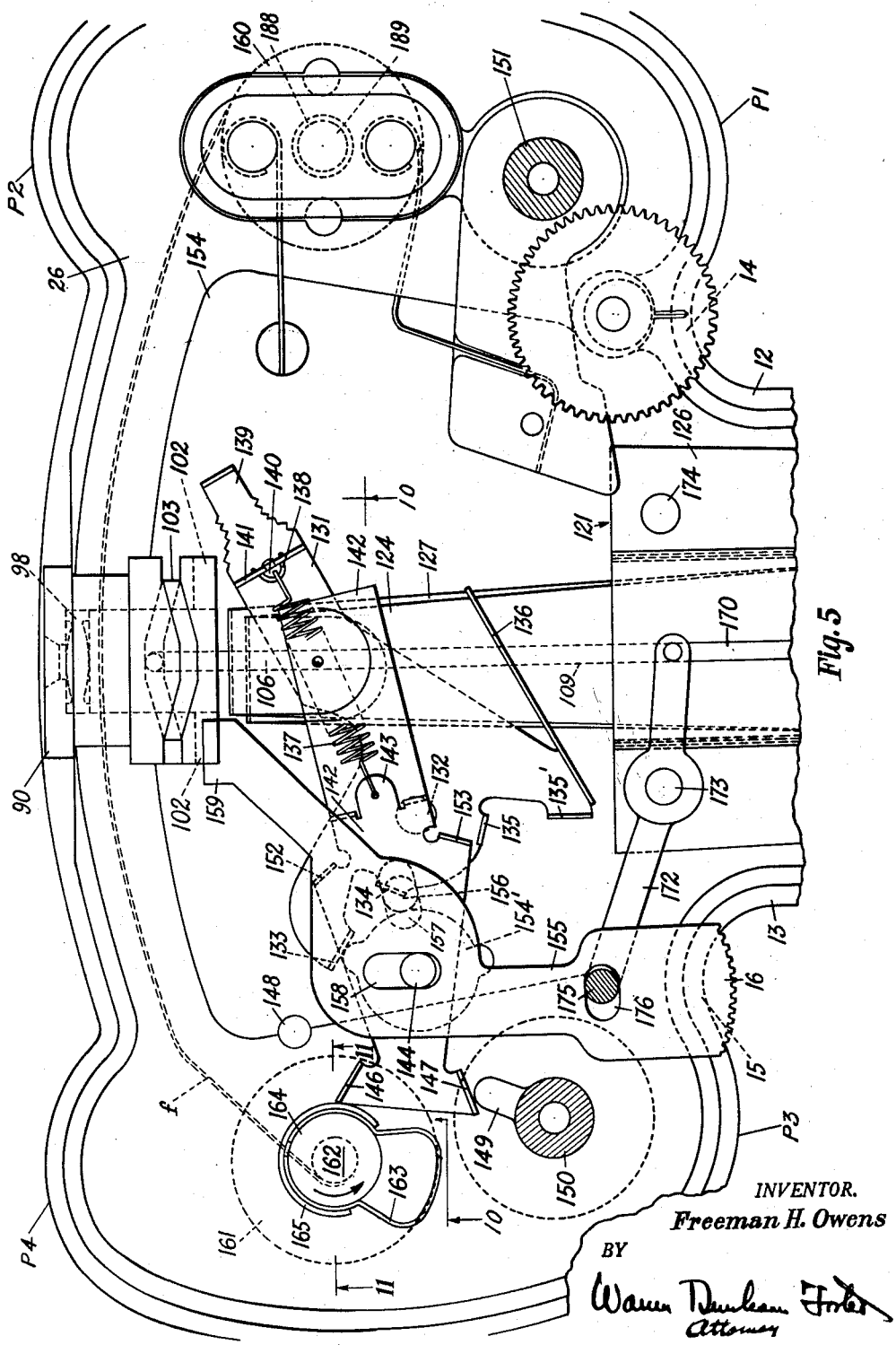

April 5, 1960 F. H. OWENS 2,931,282
CAMERA
Filed Dec. 17, 1952 8 Sheets-Sheet 6
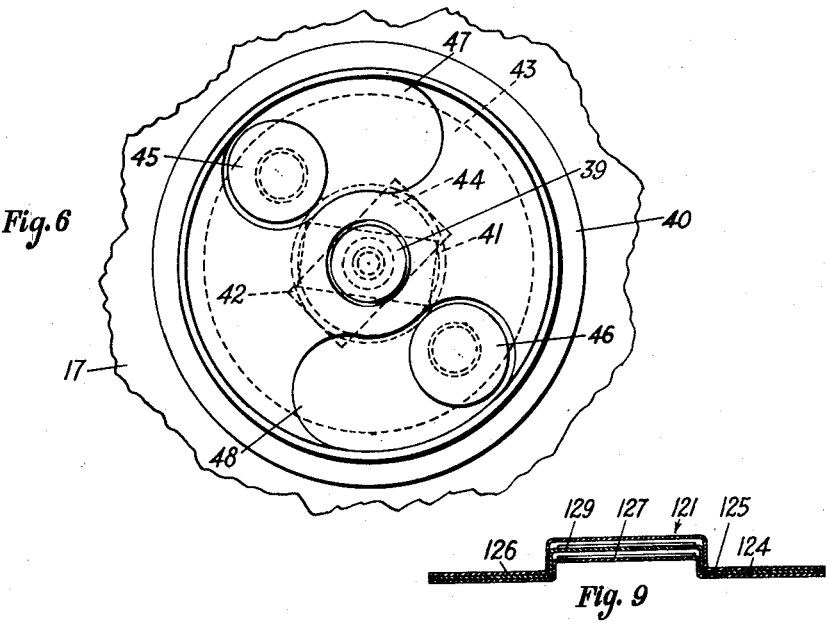
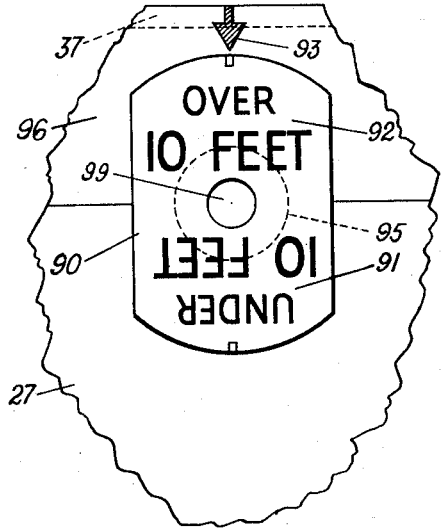
Fig. 7
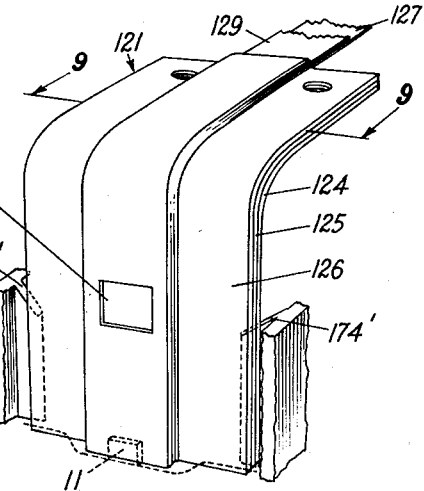
Fig. 8
INVENTOR.
Freeman H. Owens
BY April 5, 1960
F. H. OWENS
2,931,282
CAMERA
Filed Dec. 17, 1952
8 Sheets-Sheet 7
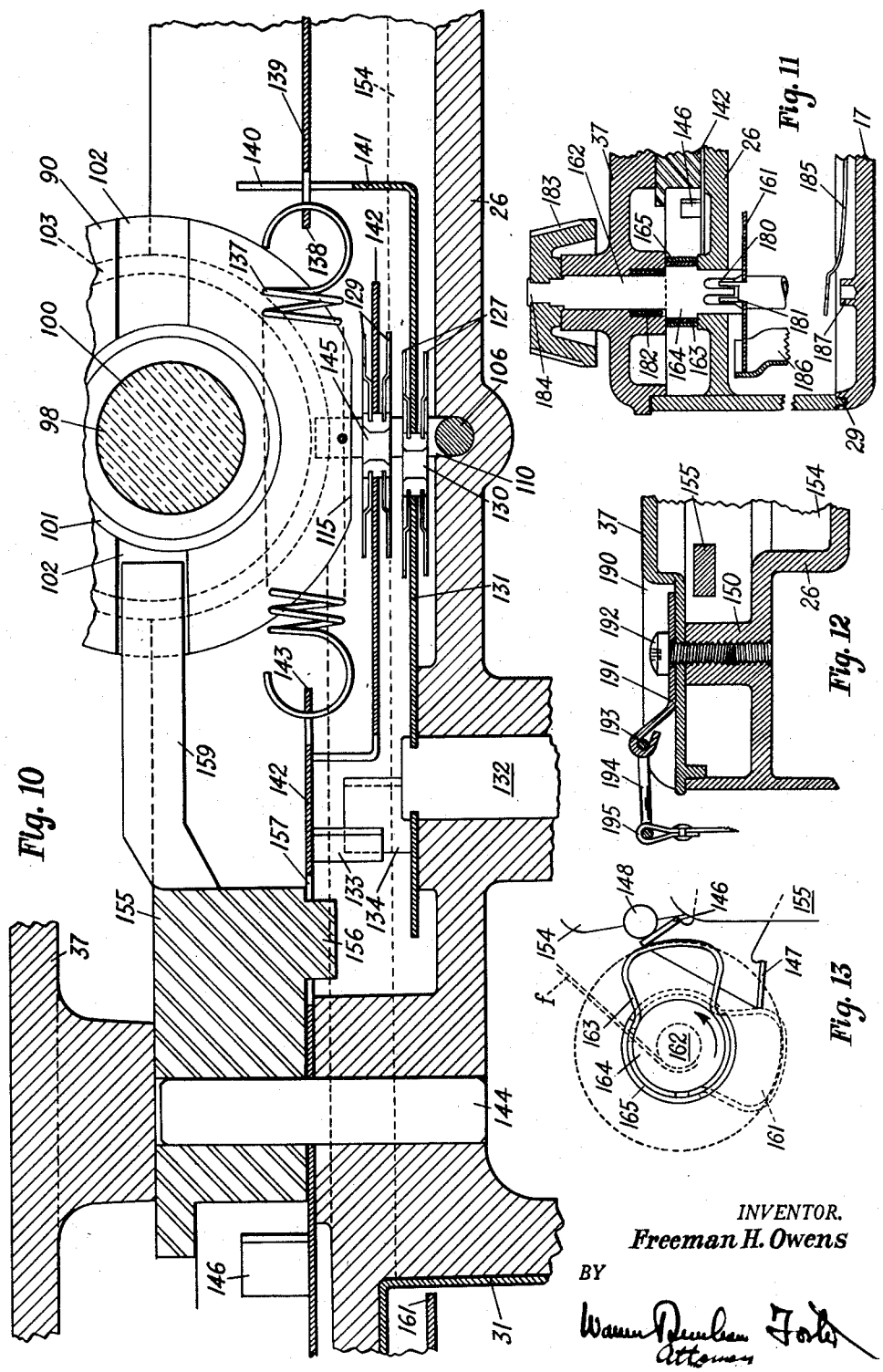
INVENTOR.
Freeman H. Owens
BY

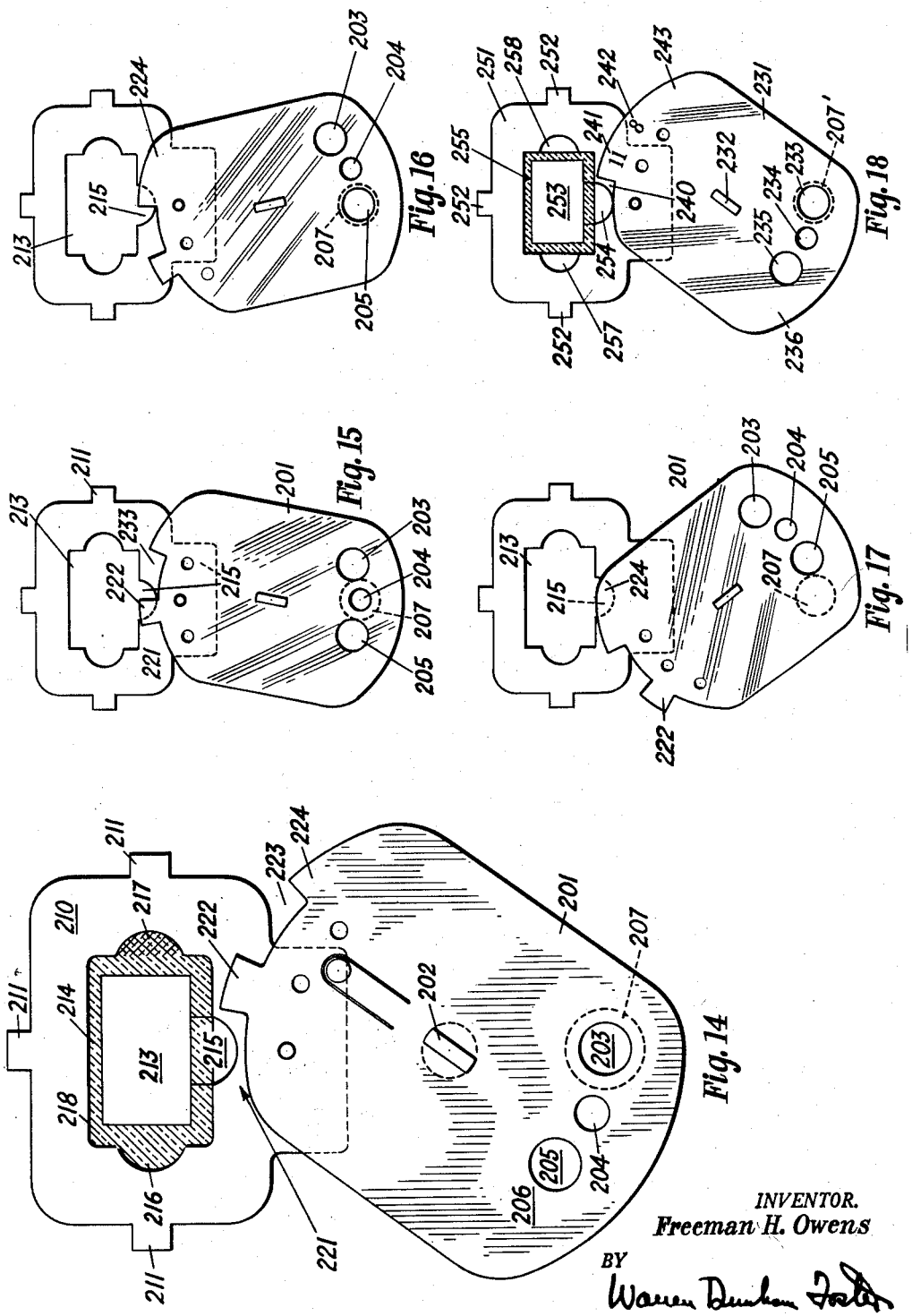

United States Patent Office 2,931,282
Patented Apr. 5, 1960

2,931,282

CAMERA

Freeman H. Owens, New York, N.Y.

Application December 17, 1952, Serial No. 326,419

87 Claims. (Cl. 95—31)

A primary purpose of this inventilon is to provide in a camera which is compact, easy to manufacture and operate, and very inexpensive certain improved characteristics and advantages some of which, so far as I am aware, are entirely novel and others of which are found only in apparatus which is complicated in construction and use and much more expensive. My invention lies in part in the provision of new, advantageous and highly simplified elements which make possible the accomplishment of the above major aim and also in a new, improved and simplified combination of these parts into a small, cheap and efficient instrument for the taking of photographs.

As in my application Serial Number 642,761, filed January 22, 1946, patented December 23, 1952, as Number 2,622,496, of which this application is a continuation-in-part, I provide a novel camera body which includes formations which give a photographer a firm grip by which he may hold a camera in one hand and a control member so constructed and disposed that he may operate the camera with members of the one hand by which he is holding the instrument with a minimum risk of causing bodily movement as the exposure is being made and so ruining a picture. I provide herein an automatic interlock between this exposure-controlling member and an aperture or iris plate which determines the amount of light reaching a film or other light sensitive surface so that it is impossible for a user to make an exposure unless he has previously moved this iris plate to a proper picture taking position. My novel shutter, which is thus rendered operable and inoperable by the position of this iris plate and actuated by this exposure-control member, is also described and is claimed per se in my co-pending application Serial No. 326,418 divisional from my said parent Patent Number 2,622,496. An important object of this invention is to provide such an improved, novel and simplified interlock.

Another closely related object is to provide a highly simplified construction of an iris plate, whether or not it controls the operability of a shutter, which makes visible through a novel finder system indications of whether or not an iris opening is so disposed that the camera is in position for the shutter to be operated to take a picture, indicates not only the iris opening which is then in effective relation to the lens but also the one which would be accordance with the then impinging light, and in addition signals whether or not the shutter has been reset and a fresh film moved into exposure position. This iris plate is adjusted by a single finger piece which also indicates the setting to which it has been moved.

This finder system thus cooperating with the iris plate also serves directly to control the position of a photographic lens and simultaneously to minimize the evils of parallax. Rotation of a portion of the finder system through simple linkage both determines the equivalent focus of the photographic lens and adjusts the field of view of the finder system correspondingly by means of a simple link operated by a continuous cam slot with a member of the finder system itself rotatable eccentrically and carrying the ocular of the finder system.

Another object of my invention is to provide a lock whereby a user minimizes the possibility of unauthorized use of his camera and prevents its inadvertent use, and at the same time provides a signal which avoids the consequences of having forgotten that his camera is locked. A related object is the provision of a solid member interposable between the outside of the lens and its shutter opening to protect lens and shutter from possible injury.

This novel iris plate and mechanism related to it thus perform a multiple function: (1) determining the effective exposure, as is usual; (2) directly carrying indicia which through a finder system indicates to a photographer the lens opening which he then has in position; (3) providing what is in effect an extinction photometer so that he can accurately determine what lens opening he should employ according to the light conditions then prevailing; (4) preventing any exposure unless an aperture is fully and properly aligned with the lens, and; (5) completely covering the lens opening when the camera is not in use to protect the lens from dirt and tampering. An important object of this invention is to dispose all of the above parts within the camera body so that they are supported and protected thereby.

In any lens system it is generally highly desirable to secure maximum illumination of a scene consistent with permissible cost and size. The accomplishment of this result is peculiarly necessary in a device such as mine in which a user must clearly discern certain important indicia within the finder system and at the same time use it as an extinction photometer. One of the objects of my invention, therefore, is to secure greater illumination and a larger finger image very cheaply. To that end I provide two single plano-concave finder lenses fixed at a distance from each other instead of a conventional single double concave lens. The latter would provide the same angle of reception of the field of view but my arrangement of two single inexpensive lenses results in the distortion caused by one being overcome by the other although a single lens of the same angle of reception would yield two cumulative distortions. This arrangement of lens elements also results in a sharp image in the center between the two plano concave lenses with adequate illumination of the sides of the field where the above-mentioned indicia and instrumentalities are disposable by movement of the iris plate.

Another closely related object hereof is to present the improvements hereof in combination with the subject matter of my co-pending application Serial Number 326,418, filed co-incidentally herewith of which this application is a continuation-in-part, said application Serial Number 326,418 being a division of my parent co-pending Patent Number 2,622,496.

A related object is the provision of mechanism whereby a user cannot change the focus of the camera until the film has been wound after an exposure and the shutter reset. Another cognate object is to present in combination with the elements hereof my novel means for the prevention of double exposure, such means being claimed in my co-pending application Serial Number 326,417, filed December 17, 1952, and upon April 24, 1956, patented as Number 2,742,835, said application being a continuation-in-part hereof and of my parent application.

Another and important object of this invention is the provision of means whereby a view-finder system is blocked until the camera shutter has been re-set and a fresh frame of a film substituted for one which has already been exposed. This arrangement is particularly important in those frequent cases in which a camera is taken up again after it has been put aside for a time. Then a user may not remember and in conventional apparatus has no way to discover whether or not has has advanced the film after he made a previous exposure—perhaps weeks previously. As a result he may advance the film needlessly, thus wasting a frame, or, if his camera is one which does not have a device for preventing double exposure, he may make a double exposure, thus spoiling two pictures. Although I prefer that my novel mechanism to prevent double exposures be employed, this portion of my invention when used alone makes impossible this common difficulty.

The objects of my invention will be understood from the general statement above as well as the specific description which follows. These objects includes the provision of a camera, intended primarily but not restricted for use by an amateur, which may be sold at an extremely low price but has the certainty and efficiency of operation and results previously secured only by an instrument costing many times as much. I prefer to apply the elements of my invention to a camera such as that described and claimed in respect of its general structure and certain subcombinations thereof in my said co-pending parent application or in a camera such as that which in general is presented hereby. An important object of my invention, however, is to provide certain elements which may be utilized advantageously in other types of cameras not making full use of this entire inventive substance. A most important object is to construct and assemble all of these elements, combinations and sub-combinations in a highly improved and simplified manner which greatly reduces their cost and increases efficiency.

To accomplish this end I provide a camera structure consisting essentially of a front panel, top wall and bottom wall and a multi-purposed irregularly shaped interior-exterior plate which establishes the focal plane of a film, forms a common wall of dark chamber and viewing chamber, supports a lens and carries all of the operable parts of my entire device except those which are mounted upon the front panel, a take-up knob and bearing spring mounted on a top plate and revoluble thereon and a lock on the bottom plate. Also this one plate is extended to form the back exterior wall, both side walls and a portion of the front wall into which the front panel slips and by which it is held. Thus the process of assembly is merely to slip the front panel into place in the forward portion of this plate and add the top wall, all other operable parts having been assembled as above indicated, and to put two screws or rivets into place. The bottom plate is attached and removed by a user every time he changes a film, it of course being necessary in all cameras of this type that one of the members be so removed. Among the obejcts of this invention is the provision of simplified structure exemplifying the above structure and mode of operation.

An important object of this invention is to combine all of the foregoing features, particularly those last above mentioned, with the characteristic shape of my camera. This shape in top plan resembles a capital letter T, with paired protuberances upon the front and back surfaces of the cross bar adjacent the end of the leg of the T, the size and shape of these formations being such that the members of each pair may readily be grasped by the fingers of one hand which thus holds the camera steady, with a control button positioned to be easily operable by a free finger of this hand. The left of the T carries an exposure aperture, this configuration preventing the unwitting obscuring of the aperture by a hand of an operator. My novel multi-purposed interior-exterior plate provides this configuration, as well as performing other important functions.

A related object is to provide two chambers, side by side, one a dark or photographic chamber and the other a viewing or operating chamber, this one plate furnishing a common wall in a first plane, whereon many of the important operating parts are mounted, including shutter-operating mechanism and part of the combined taking up and shutter re-setting mechanism. A photographic lens is disposed in a second plane intersecting the first at a substantial angle, preferably on the same plate. An important object is to provide a resilient shutter blade or blades for this lens operated by such mechanism in the first plane and alternatively opening and closing the lens in the second plane, together with a guideway for directing the blade(s) in an arc from one plane to the other. I provide formations which position this guideway by the act of assembly of parts of the camera.

Other objects, characteristics and advantages of my invention will be clear from the following portion of this specification, the attached drawings and the sub-joined claims. For purposes of illustration only I am showing preferred forms only of my invention but it will be readily understood that changes may be made therein without departing from the spirit of my invention or the scope of my broader claims.

In the drawings:

Figure 4 shows the parts ready for an exposure to be made.

Figure 5 is a vertical section generally corresponding to Figure 4 and taken on the line 5—5 of Figure 3 but showing the shutter control parts in the position to which they have been moved after an exposure has been made, certain parts, including the front portion of the T structure, having been omitted for clarity.

Figure 6 (sheet six) is a bottom plan view of a locking arrangement shown in section in Figure 3.

Figure 7 is an enlarged fragmentary rear end elevation of an upper portion of the finder system of Figure 3, taken as indicated by 7—7 on that figure, showing a control plate associated with the ocular of my view finder lens system which through my characteristic cam-control member sets the focus of my camera lens.

Figure 8 is an enlarged fragmentary perspective view illustrating my flexible shutter blades in the guideways therefor.

Figure 9 is a section taken on the line 9—9 of Figure 8.

Figure 10 (sheet seven) is an enlarged fragmentary section taken on the line 10—10 of Figure 5, but showing the shutter-operating parts in the position of Figure 4.

Figure 11 is a fragmentary vertical sectional view showing my take-up device and taken on line 11—11 of Figure 5.

Figure 12 is a fragmentary section illustrating the manner in which the top cover of my camera is mounted and the means by which a carrying strap is attached.

Figure 13 is a fragmentary view corresponding to a leftward portion of Figure 5 but showing my shutter setting device as having moved the exposure control mechanism to a position with the shutter reset ready to take a picture.

Figure 1:
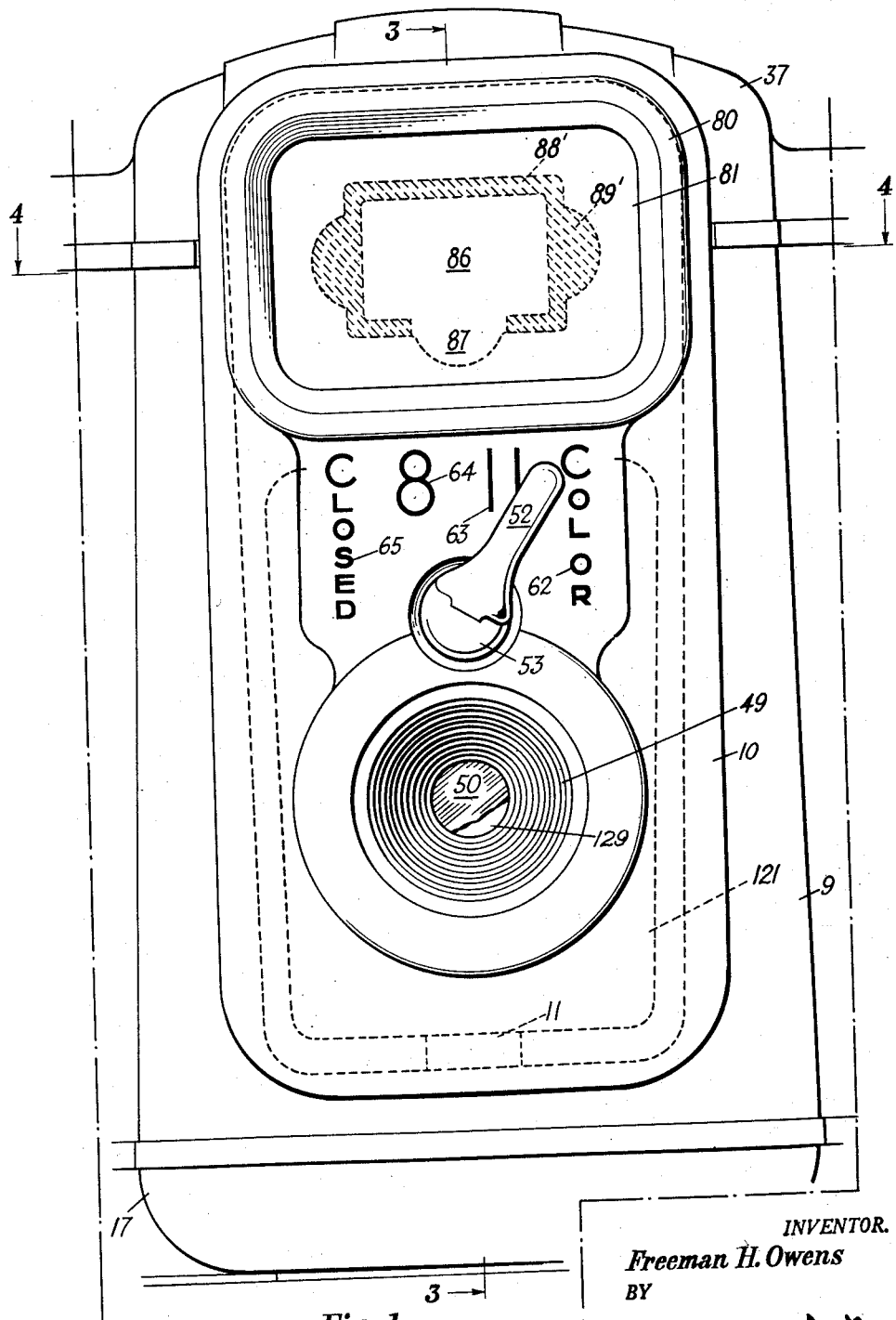
Figure 1 is a front elevational view of the central portion of my camera, certain parts being omitted for clarity.

Figures 14 to 18 both inclusive (sheet eight) are fragmentary views of modifications of certain aspects of my invention showing a different type of iris plate, visual signalling system, and light measuring devices.

Figure 14 shows an iris plate with solid visual signalling indicia disposable within a field of view through a lens of a view system to show what iris opening if any then is in effective relation to a photographic lens. In Figure 11 the opening in my view finder system is unobstructed thus indicating, for example, that the iris for a camera lens is disposed in wide open position as for color film.

Figures 15, 16 and 17, from which certain filters have been omitted for clarity, are reduced views corresponding to Figure 14 and showing different positions of data in a window of my view finder lens system visually indicating different lens openings.

Figure 15 shows my view finder indicia in a position wherein the leftward half only of the data opening as viewed in this figure is obstructed thus visually indicating that a relatively small iris opening for a camera lens, f11 for purposes of illustration, is disposed in front of the photographic lens.

Figure 16, wherein the rightward portion only of the sight opening as viewed in this figure is obscured, visually indicates that a large iris opening is disposed in position.

Figure 17 shows a solid portion of the plate before the photographic lens with the sight opening blocked.

Figure 18 shows a variant wherein the value of a setting of a light-admitting opening then in effect is represented as by a cut-out figure appearing in a signalling opening, or, in the setting shown, no signal is visible thus indicating a setting appropriate for color, for example.

In this specification and the claims the words "right" and "left" are from the point of view of a user who holds my camera to take a picture, except as stated to be from the point of view of the drawings. In figures taken from the front the right and left positions are reversed from those of a user. The words "upper" and "lower," "forward" and "back," "front" and "rear" and "vertical" and "horizontal" are similarly used, always with the camera held in usual operative position, with the finder system at its top. Like words and derivatives are similarly used.

My housing is characterized by an outer casing T-shaped in top plan and with cooperating pairs of protuberances in each end of the cross bar of the T and a lens aligned with the bottom of the leg of the T. A front wall 9 has an opening wherein a view finder panel or front plate 10 with a rearward positioning boss 11 is supported. Side walls 12 and 13 are integral with this front wall 9 (and with plate 19 later described) and generally parallel to the optical axis. These side walls and the back wall include paired protuberances P1 and P2 formed in one end of the cross bar of the T outside of re-entrant curve 14 and P3 and P4 formed in the other end of the cross bar outside of re-entrant curve 15. These protuberances are of such size and shape that those of each pair can readily be firmly grasped. All these walls, including back wall 27, are integral with my novel multi-purposed interior-exterior plate 19 later described. A shutter control button 16 projecting forwardly through re-entrant curve 15 may readily be pressed by one finger of a right hand of a photographer, the other fingers and palm of this hand then grasping the camera. This button moves parallel to the optical axis of the camera thus not jarring the camera and producing a clear and sharp picture. Such often is not the case following use of a button movable perpendicularly to this axis. This shape and relative position of external parts appear in my said co-pending parent application.

An exterior bottom plate 17 at its forward end by a dovetail 18 (Figures 2 and 3) is detachably joined to this irregularly shaped interior-exterior multi-purposed wall or plate generally indicated as 19 which extends first backwardly as indicated at 19', parallel to bottom wall 17, and thence upwardly as indicated at 19" to define an opening 20 which receives a mount 21 for lens 22. See Figure 3. A central opening through this mount has a shoulder 20' against which the lens rests. A forward flange 22' contains an annular slot 24 open at its forward end for receiving a forward ring-shaped end 109 of a focusing control rod 106 later described. A rearward flange 24' supports the mount for movement in opening 20. The lens 22, placed against shoulder 20', and the control rod are held in place by a retainer plate or clamp 23 which by resilient flanges or wings 23' is snapped onto the lens mount, without use of tools. The forward parts of plate 19 also cooperate with front panel 11. A boss 25 upstanding from the plate enters an opening 26' in the bottom of positioning boss 11, thus simplifying assembly, as later appears.

This interior portion of this multi-purposed plate thence extends rearwardly as an inner top or intermediate wall 26 forming a partition between a dark chamber and a viewing chamber. Thence it extends upwardly at 97 and downwardly to form a rear wall 27 having a sight opening 28 with a protective filter through which numerals are visible upon paper backing of a film f indicating the number of a "frame" then in exposure position. This plate also continues forwardly to form side walls 12 and 13 as stated above. At its rear this plate is joined to bottom wall 17 by the dovetail 18 which extends entirely around the outside wall of the camera. A backwardly facing guide 30 adjacent and forwardly of the junction of the top and rear portions engages the upper margin of the film and forms the upper edge of a film exposure aperture.

An irregularly formed integral bottom and multiple side interior plate 31 includes a rearward and upwardly facing film guide 32 corresponding to film guide 30 and forming the lower boundary of the exposure aperture or gate 33 for the film f. Plate 31 also includes an irregular lower central inwardly or upwardly extending offset 34 for reception of my locking device later described. Plate 31 extends upwardly on each side to complete dark chamber 35, the cone of which is indicated by dash lines in Figure 3.

An outer top wall 37 completes the housing. This wall has a downward forward lug 38 fitting into an upward depression 38' across the top of front panel 10 and a rear flange with a bearing surface 96 which with upstanding formation 97, both later described, of back wall 27 forms a mount for a rotatable control cam and ocular-supporting member 90. Both this upstanding formation and the back wall are parts of multi-purposed plate 19. In a later discussion of assembly I present means for fastening this top wall to the remainder of the housing.

Figure 3:
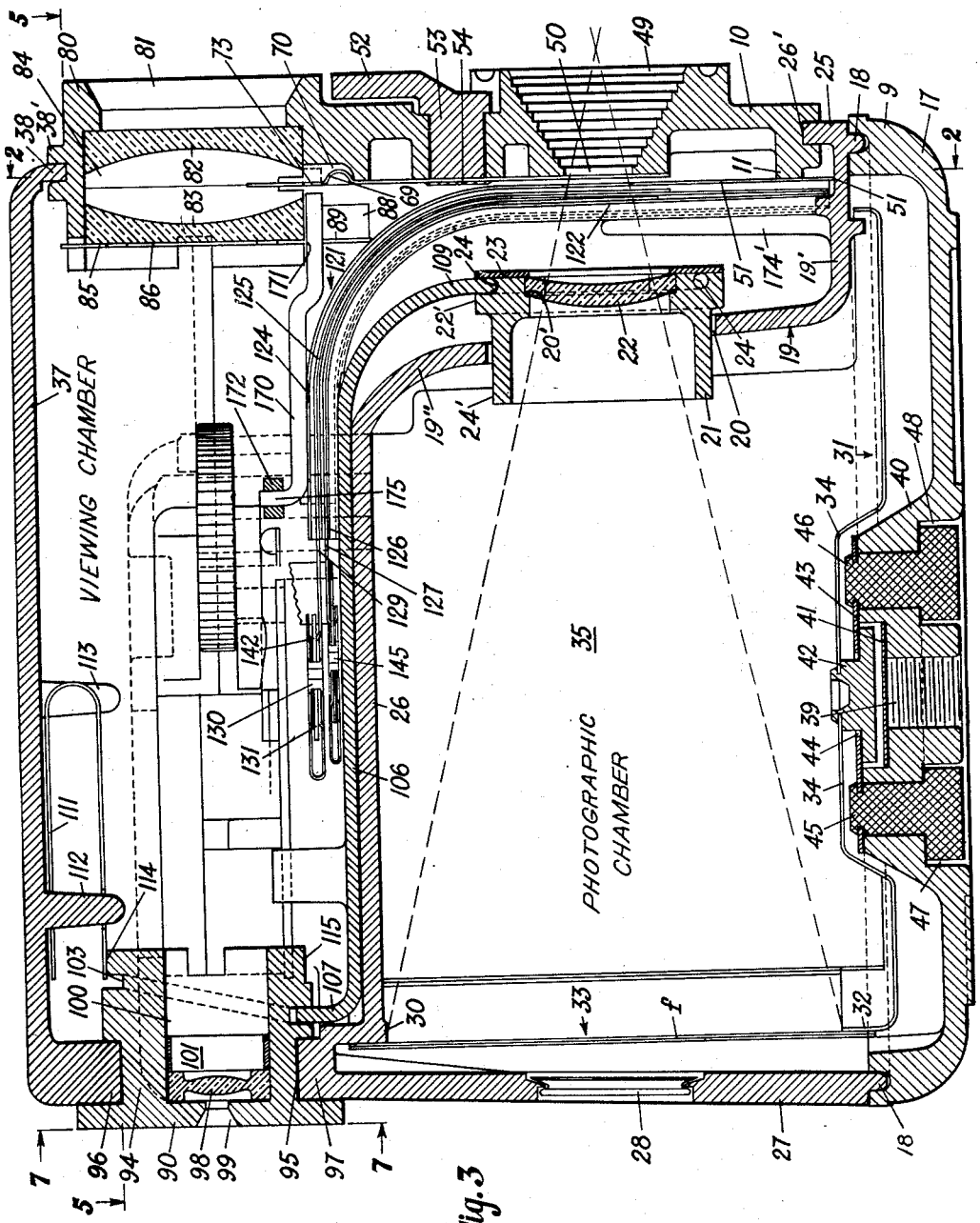
Figure 3 is a vertical section of my camera taken on the line 3—3 of Figure 1.

The camera may be mounted on a standard tripod screw by an attaching device such as is seen in Figures 3 and 6. This mechanism also serves removably to lock the bottom plate 17 in fixed relation to the remainder of the camera. This plate is removed when a roll of exposed film is to be taken out and a roll of fresh film inserted. A threaded opening 39 is formed in a central portion of a tapered boss 40 in bottom plate 17. A baffle 41 swedged into an appropriate opening in the upper central portion of this boss prevents light entering through the threaded opening from fogging a film. A lock 42 rectangular in its locking portion is fixedly attached to bottom plate 31 of the body of the camera. An operable locking plate 43 having a central rectangular opening 44 engages and is disposed above the rectangular locking surface of lock 42. This opening is of the same contour but larger than the locking plate over which it is disposed. Pins 45 and 46 fixed to operable plate 43 are guided in arcuate slots 47 and 48 formed in boss 40, as seen in Figure 6. By reason of this construction it will be readily understood that as these pins are moved within the slots the locking surface of locking plate 43 is rotated into alignment with the slot 44 of locking formation 42 with the corresponding sides parallel so that bottom plate 17 can be taken off as for the removal of a roll of exposed film and the insertion of a fresh one.

Before explaining my novel lens control means, shutter, shutter operating means and view finder lens system I shall describe the front portion of my camera which includes elements with which the operable portion of my view finder lens system, camera lens control, anti-parallax device, shutter control, and shutter indicator directly or operatively interlock.

Front panel 10 includes a forwardly facing exposure recess 49 (Figures 1 and 3) terminating in an opening 50 in line with camera lens 22. This lens is supported on and movable by mount 21 by a simple mechanism operated by my view finder lens system, as later described. Cooperating with this opening is an iris plate generally indicated as 51, shown in Figures 2 and 3, which forms an important and novel element of my invention. This iris plate is pivoted upon the rear of a lower central portion of front panel 10 in front of camera lens 22 by an indicating and handle member having a finger hold, pointer and lever 52 external to the plate, a stem 53 passing through an opening in the front wall, and a head 54, by which finger and stem are attached to the iris plate 51.

Figure 2:
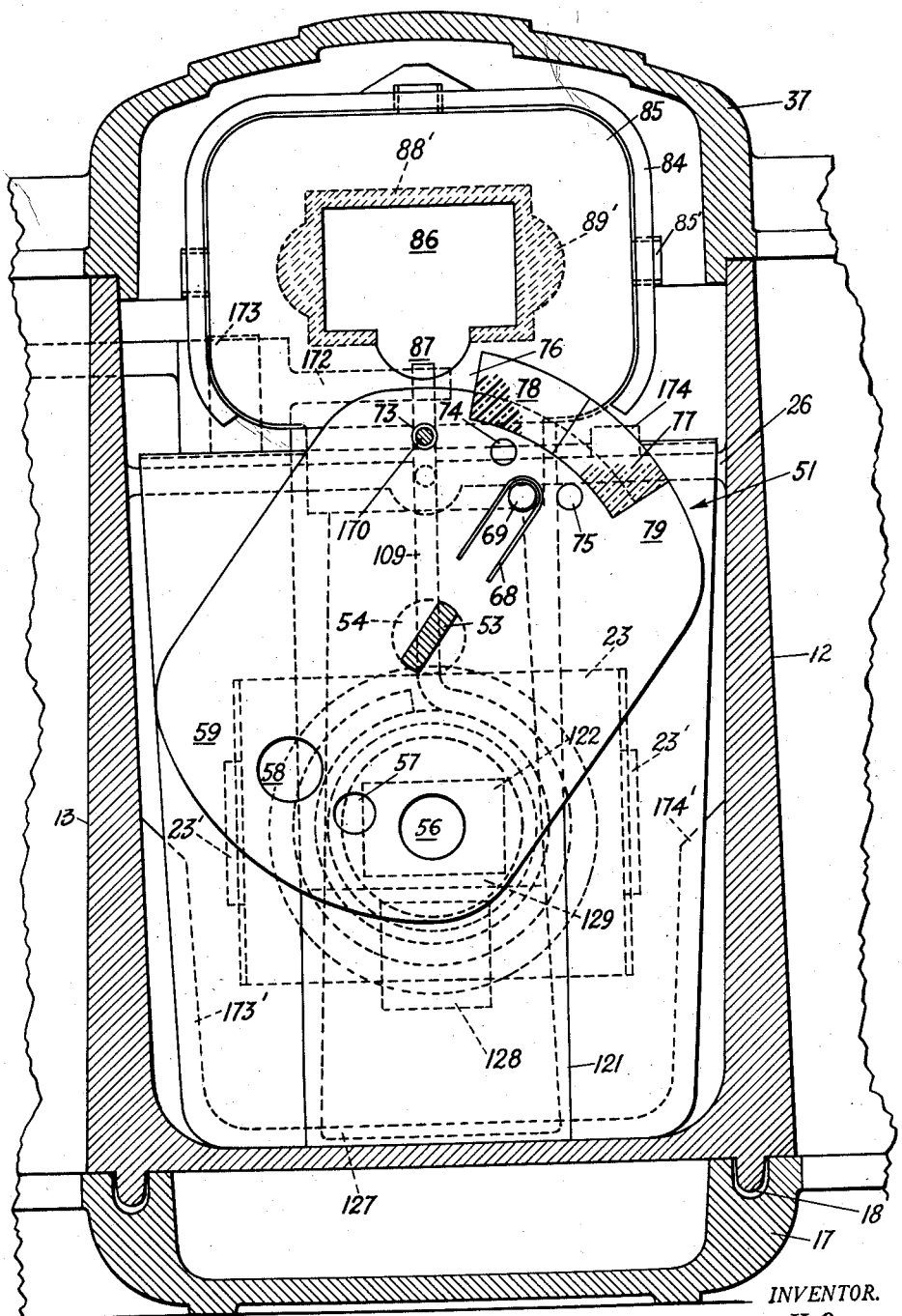
Figure 2 is a vertical section taken on the line 2—2 of Figure 3, my front view finder panel having been removed.

As shown for purposes of illustration only and as is best seen in Figure 2 I form three photographic apertures or openings 56, 57 and 58 in this iris plate each of which is selectively disposable in line with the optical axis of the lens. It will of course be understood that instead of these three apertures I may use any desired and practical number. Beyond or to the left as viewed in Figure 2 is an opaque portion 59 the reason for which will later appear. As shown opening 56 is full and for use with a color film; 57 to relatively small and represents an opening for purposes of illustration only of $f11$; while the remaining opening 58 is large and represents a diaphragm opening of $f8$. As pointed out in my co-pending parent application I find it desirable in a camera which is to be used by unskilled amateurs to place a photographic lens within the interior of a camera so that it cannot readily be tampered with or soiled by an unskilled or careless user. I therefore prefer to arrange this opaque portion of the iris plate within the interior of the camera between the fixed exposure opening in the front wall of the camera and the lens so as to afford complete protection when the camera is not in use and so that an exposure can not be made by inadvertence. As will be seen from Figure 1 I supply indicia 62, 63, 64 and 65 respectively as "Color," "11," "8," and "Closed," corresponding to the openings of the iris plate and the opaque portion as previously described. When finger-piece or handle pointer 52 is moved to each of these indicia an exposure opening or the opaque portion of the iris plate thereto will be disposed before the lens. It especially will be noted that this finger piece performs a double function in that it definitely points to each of these indicia in turn as well as providing an adequate finger hold by which the iris plate may be positioned as desired. Other results obtained by movement of this finger-piece will later be presented.

In order to hold this iris plate in the positions to which it thus has been moved I form a detent by a simple deformation of a portion of the iris plate. As will be seen from Figures 2 and 3 a portion 68 of this plate is bent forwardly at 69 to form a spring detent lock which successively engages each of a series of detent openings of which only one 70 is shown formed in the rearward surface of the upper center portion of the rear surface of front panel 10, as shown in Figure 3.

Adjacent and above this formation three locking openings 73, 74 and 75, one for each iris opening, 56, 57 and 58 respectively, are formed in this iris plate for the reception of my locking rod 170 later described in connection with my novel exposure control mechanism of which it is a part.

This iris plate also carries elements of a device which performs the function of an extinction photometer and indicia as to the iris opening then in operative relation to the lenses and visible through the view finder lens system. An opening viewing space 76 appears above the body of this iris plate and two translucent exposure calculating or photometric sheets 77 and 78 are disposed to the left as viewed in the drawings of an opaque portion 79 of an upper (rightward) edge of the iris plate. See particularly Figure 2. Sheets 78 has greater light retarding characteristics than sheet 77, the former corresponding to an opening of $f8$ and the latter to a larger opening illustrated as $f11$. The operation of this photometric device later will be made clear. By reason of this construction it will be evident that rotation of the finger and indexing piece 52 will selectively bring the various locking openings in line with the lens and will simultaneously advance the respective photometric elements to viewing position opposite the photometric viewing opening 87.

My view finder system, which will best be understood by inspection of Figures 2, 3 and 7 will next be described. (Figures 14 to 18 both inclusive shown variants.) This system is closely interlocked with this iris plate and with the photographic lens. Within a front finder frame 80 in front panel 10 I place front finder opening 81. Rearwardly thereof I vertically mount two plano-concave finder lenses 82 and 83, within a recessed formation 84 extending backwardly from the upper portion of front of panel 10 with the concave surfaces adjacent and spaced from each other. See Figure 3 in particular. A fixed finder mask 85, with lips 85', which has a viewing opening 86 and a semi-circular photometric viewing opening 87 leading from the lower edge of the mask opening, disposed behind these finder lenses, secures these lenses in position. Lips similar to 211 of Figure 14 may be employed to lock this mask into position. Suitable openings are cut in the rearward portion of recess 84 for the reception of this plate and its retention in operative position. A portion of this mask is bent into lips 88 and 89 which lock in position three flanged shutter guideways 124, 125 and 126 later described which form a side-walled channel through which my resilient exposure shutter blade 127 and cover-up blade 129 move from and to exposing position.

These view finder lenses are negative or plano-concave. As will be seen, the finder lenses are of relatively large size to give a relatively large angle of view of a scene and bright illumination not only of the field of view but also of the photometric sheets 77 and 78, which as will be readily understood from the drawings are moved into and out of viewing position in line with a photometric opening 87 by the movement of the iris plate. This optical construction so far as I am aware is entirely novel. The use of two plano-concave lenses fixed in spaced relation to each other affords a construction which cheaply overcomes much of the distortion of a double concave lens. Distortion caused by one is corrected by the other. A magnifying ocular 98 completes this view finding optical train. Thus a brilliant relatively well-corrected enlarged image is produced right side up by optical elements the cost of which is relatively little.

The rearward or ocular carrying portion of my finder system will be seen in Figures 3 and 7. An important characteristic of my system is that an ocular is eccentrically mounted in such manner that the field of view is changed as the focus of the camera is changed, thus reducing parallax. A multi-purposed control or cam member 90 is rotatable upon a fixed axis at the rear of the camera, its rotation through a suitable connection moving the camera lens to focus the instrument. The rear outer surface of this member carries legends "over ten feet" 91 and "under ten feet" 92 which cooperate with an arrow 93 on the rear wall of the camera. For purposes of illustrating my invention in a simple form, I am showing only two positions of the camera lens: "Over ten feet" for far distant objects and "under ten feet" for near objects. It will be understood that any practicable number of settings may be used, in such instances the indicia representing distance in feet or meters from infinity. An inner forwardly extending portion 94 of this control member rotates in an opening 95 formed between depending formation 96 of top wall 37 and upstanding formation 97 of intermediate wall 26. An ocular 98 disposed toward the interior of the camera from a recessed sight opening 99 is eccentrically mounted in a central opening 100 of the control member 90 for rotation therewith. The ocular is held in place by a spring ring 101. Because of this eccentric mounting it will be seen that rotation of the control member from one focus-position to the other (or to another if more are employed) minimizes the results of parallax by changing the field of view in the finder to correspond generally to that of the camera lens. In a manner which later will be described the rotation of this control member also moves the photographic lens along its optical axis thus focusing the camera.

I utilize this control member both to set the focus of the photographic lens, as already stated, and also to provide a signaling interlock between the finder system and the exposing mechanism so that the control button 16 cannot be operated to make an exposure unless an iris opening is in alignment with the camera lens. A central annular exposure-control slot 102 is formed in ocular-control member 90 as clearly seen in Figure 10 in a plane horizontally intersecting the optical axis of the ocular. As is described hereinafter in connection with the operation of the shutter, this control slot in cooperation with control extension 159 of operating bar 155 which is an extension of control button 16 prevents the making of an exposure except when the ocular-control member has been operated to move the photographic lens completely into one of a plurality of predetermined positions. Also it prevents the changing of the focus until the film is wound to the next frame, this operation resetting the exposing mechanism, all as will later be explained.

By reason of the above construction of the iris plate in relation to the finder system it will be understood that rotation by a user of handle or lever 52 between the four positions, shown for purposes of illustration only, ranging from "color" to "closed" through "11" and "8" brings the appropriate openings of the iris plate or the opaque portion of the lower part of this plate into operative relation with the lens. Also as a photographer looks through the view finder lens system this rotation also places the appropriately corresponding instrumentalities upon the top of the iris plate in alignment with the photometric opening 85 and into the fully illuminated field of his vision thus assisting in obtaining a correct exposure, or making clear in the case of the closing of the photographic aperture that no attempt should be made to take a picture. Color films, as will be readily understood by those skilled in photographic art, require more illumination than black and white films of emulsions of speeds which are ordinarily employed. Thus as a user looks through the photometric opening without an obstruction, the open space 76 being in place as in the position shown in the drawings, unless he sees a scene very clearly he knows that he does not have sufficient light to make a color exposure and must either use artificial lighting or await a brighter day. When the rotates the iris plate by movement of handle-pointer to the next position so that screen 78 covers the photometric opening and the relatively small opening 57 is in line with the lens he knows that he does not have the light necessary to make exposure (on black and white film) unless through that screen 78, which is more nearly opaque than screen 77 next in progression, he sees his objects clearly. Then he knows that he must continue rotation of the iris plate to bring photographic opening 58 in line with the lens and filter 77 in line with the finder system. Then again unless he clearly sees the scene he knows he has insufficient light for the proper exposure. When the iris plate is rotated to completely closed position opaque section 59 is in front of the photographic lens and opaque section 79 of the iris plate in front of the photometric opening 87 thus as the photographer looks through the finder system indicating to him that no exposure is possible. Thus I combine in a single simple structure the functions of an iris plate and an extinction photometer.

As will later appear, this iris plate also cooperates to prevent a photographer from trying to take a picture unless the iris openings are properly and completely aligned with the camera lens.

As previously stated photographic lens 22 is disposed in mount 21 for movement forwardly and backwardly in opening 20. Control of this lens is closely articulated with the view finder lens system just described. A cam slot 103 which encircles finder control member 90 is one of a small train of simple members through which the photographic lens is moved between near ("under ten feet") and far settings ("over ten feet"). Such movement is automatically accompanied by the elevation or depression of the ocular of the view finder to adjust for parallax. A control rod 106 with an upstanding rearward follower end 107 engages cam slot 103. An annular slot 24, previously mentioned, vertical in cross section, is provided at the forward portion of mount 21 for engagement by a forward and downward extension 109 of this rod. This rod works and is guided in a groove 110, omitted for clarity except in Figure 10, in the top of intermediate wall 26.

A leaf spring 111 is pivoted (by its leftward upper end as shown in Figure 3) upon lug 112 depending from top plate 37 and guided between two similar but spaced lugs of which only one 113 is shown. The free end of this spring bears upon a flat surface 114 formed in the forward edge of control or cam member 90 when the parts are in the position shown in Figure 3. When this cam member is rotated to an opposite position this end of the spring bears upon a flat surface 115 formed diametrically opposite surface 114, in order to hold the control member in the position to which it has been moved. A number of flat surfaces corresponding to the number of operating positions (shown for purposes of illustration as only two) of course is to be provided.

By reason of this construction it will be seen that rotation of ocular carrier 99 as shown in Figure 7 from the position shown in Figure 3 will tend bodily to raise ocular 98 and at the same time by means of follower 107 working in cam slot 103 through rod 109 will move photographic lens 22 forwardly away from the film thus bringing a near scene into focus. As the eye piece of the view finder is thus raised compensation for parallax between the finder lens system and the camera lens will be afforded. Correspondingly as the control member 90 is rotated to the "over ten feet" position 91 the lens is moved rearwardly and the ocular of the view finder is lowered, thus again compensating for parallax. Thus it will be understood that through this simple mechanism interlocking the camera lens and the view finder lens system the effective focal length of the camera lens is changed and parallax is overcome.

As previously explained an important object of my invention is to provide mechanism which prevents an attempt to make an exposure except when an iris plate is properly positioned before the lens. In order to explain this feature of my invention it is necessary that I describe my novel shutter the control of which is interlocked with the iris plate, the form and operation of which has previously been described. A full description of this shutter per se and means to synchronize its operation with that of a flash bulb and claims thereto will be found in my co-pending application divisional from the parent hereof, Patent Number 2,622,496, filed December 17, 1952, as Serial Number 326,418.

A curved fixed shutter guideway generally indicated as 121 in form roughly resembling an inverted letter J as seen in Figure 3 extends between lens 22 and front lens opening 50 upwardly and then backwardly along the front portion of the top wall of the dark chamber 35. It is provided with an exposure opening 122 in alignment with the lens and its front opening. This guideway consists of three parallel guiding surfaces, as will best be seen in Figures 8 and 9, an inner or lower surface or wall 124, a middle surface or central partition 125 and an outer or upper surface or wall 126, each having a supporting flange at each side, to which the same reference character has been applied as to the guiding surface itself, with a prime character added.

An exposure shutter 127 with an exposure opening 128 (Figure 2) is disposed for longitudinal movement between lower wall 124 and central partition 125 of the guideway. This shutter is in the form of a thin leaf spring so that it follows the curvature of its guideway. A cover-up shutter 129 similarly constructed is disposed between center partition 125 and upper partition 126 in the guideway. The junctions of the surfaces of the guideways are straight and close and the edges of the shutter leaves are straight, thus preventing jamming. When the shutter has been re-set and is ready for an exposure to be made opaque portions of both blades are before the lens. As these resilient shutter plates by mechanism later described are pulled to exposure position the cover-up blade 129 is first pulled into position above and clear of the lens. Then aperture 128 of exposure blade 127 is pulled rapidly over the lens to make the exposure. Before the exposure shutter is re-set (by the pushing of the exposure blade to its original position) the cover-up shutter has been automatically advanced (pushed) to a position covering the lens so that the film is not exposed during re-setting when the exposure aperture passes the lens. Such timing per se is common in conventional pivoted shutters. The photographically operative movement of my elements is entirely in a vertical plane and in vertical directions as the film is held in normal picture taking position. This plane is parallel to that of the film and one normal to the principal optical axis of the lens. There is no pivotal movement. As will later appear, only one tensioned spring applies force to the shutter to make an exposure in comparison to the two (or more) in conventional shutters. I show these shutter blades as of one piece but each may be made of two elements, one light obscuring and one a flexible connector between it and the operating mechanism later described.

Figure 4:
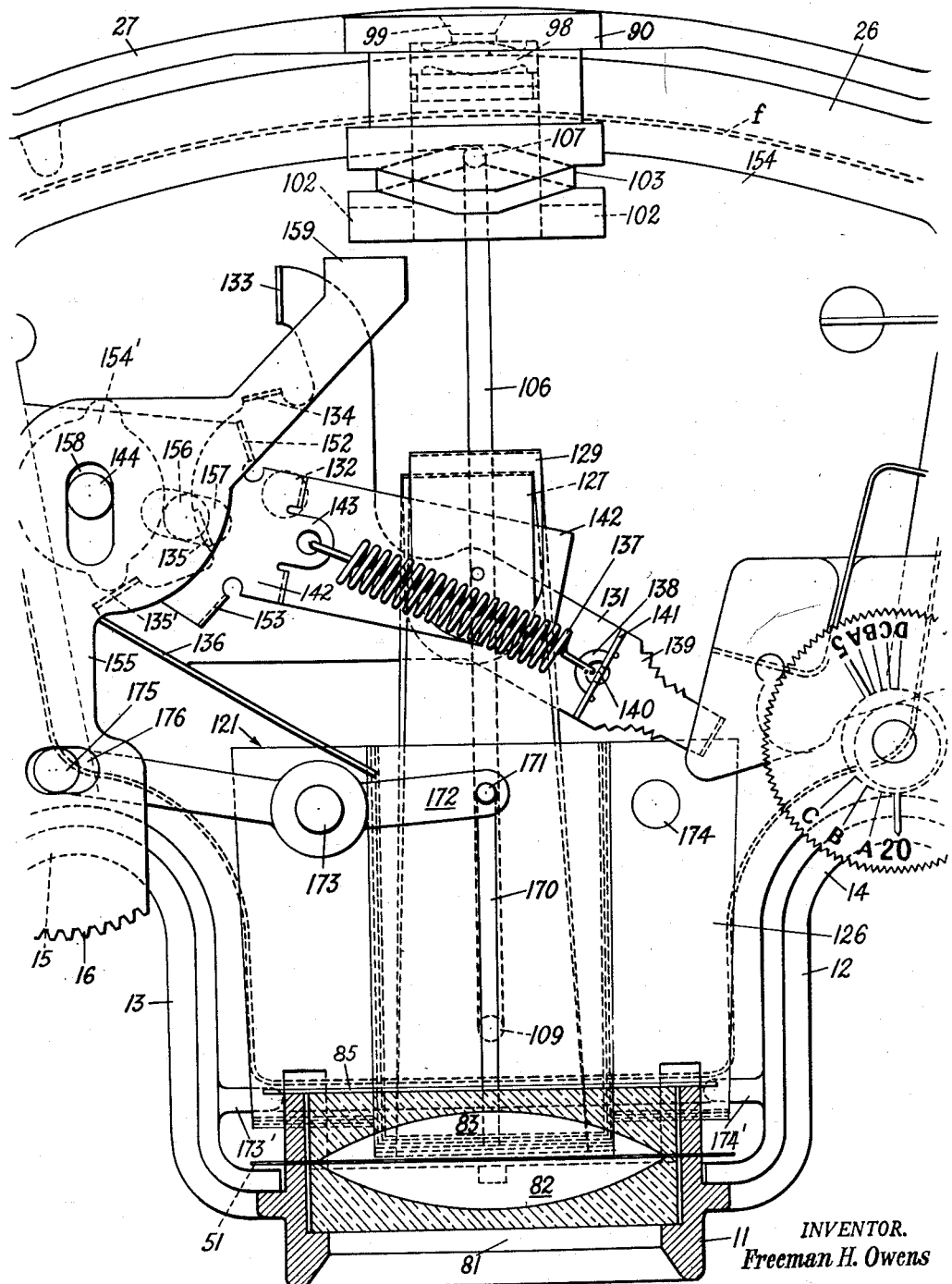
Figure 4 is a horizontal section taken on the lines 4—4 of Figure 1, certain parts, including the side protuberances, by which the camera is held steady, being omitted for clarity.

The construction and operation of control mechanism for my shutter and its interlock with my take-up will be clearly understood from Figures 4 and 13 which show the parts in position ready to take a picture and Figure 5 which shows the parts in the position to which they have been moved by the act of making an exposure. Figure 10 shows in section certain of the shutter-control parts in the position of Figure 4.

The rearward end of shutter spring plate 127 is turned back upon itself and by a rivet 130 is attached to an irregularly shaped primary exposure shutter lever 131 pivoted for rotational movement upon a pin 132 set in intermediate wall 26. This lever is formed with upstanding lips 133, 134, 135 and 135' the purpose of which will later become evident. Also it includes an upstanding and off-set blocking flange 136 which cooperates with the finder view system in a manner later to be described.

Movement is communicated to this primary pivoted lever 131 by a toggle spring 137 one end of which is connected to an ear 138 in a tension stub flash light synchronizing brush link 139 which extends through an opening 140 (Figure 10) in an upstanding portion 141 of shutter lever 131. This stub link in effect forms a rightward extension of this shutter lever as viewed in Figures 4, 5 and 10. Thus shutter lever 131 operates my flash synchronizing device, which is not described in this application. The single spring 137 when actuated furnishes all the force which operates both levers to make an exposure and to prepare for a following exposure, in comparison with the two or more springs conventionally employed in camera shutters.

This primary shutter lever 131 in turn is operated by an irregularly shaped intermediate or cover-up shutter lever 142 having a spring attaching ring or lug 143 to which one end of toggle spring 137 is attached. The other end of this toggle spring is attached to the corresponding ear 138 in the leftward portion as viewed in the drawing of synchronizing stub link 139, thus producing a tensioned stub link and applying tension to the control button 16. This intermediate lever 142 is pivoted upon a stud 144 which as later described serves other purposes also. As by a rivet 145 this intermediate lever is directly attached to the cover-up shutter 129, the rearward end of which is doubled back upon itself for this attachment. Thus pivotal movement of intermediate link 142 by push button 16 directly moves the cover-up shutter while differential toggle movements communicated through increased tensioning of spring 137 operate the exposure shutter, all as later described. Thus this single spring also effectuates the operation of a flash light and the exposure of the film. The leftward end of this intermediate lever as viewed in the drawings terminates in two upstanding lips 146 and 147 the outer surfaces of which coact respectively with a stop lug 148 upstanding from the intermediate wall 26 and a stop lug 149 which is a backward extension from a lug 150 which together with lug 151 (Figure 5) rises from the intermediate wall 26 and is threaded for screws 192 (later described) which hold cover 37 in operative relation to the camera as a whole. Two lips 152 and 153 extend downwardly from this lever 142. As will be noted from Figures 4 and 5 a central portion 154 of intermediate wall 26 is sunken to accommodate these lips and certain of the above parts. A boss 154' acts as a stop for lips 134 and 135'.

Exposure is actuated by manual movement of primary operating link 155. The forward end of this link terminates in the push button 16 which extends through re-entrant curve 15 of outer wall 13 of the camera where it is easily available to a finger of an operator upon the hand by which he holds the camera, all as previously described. See Figures 4 and 5. A pin-like formation 156 extending downwardly from the operating link 155 moves in a slot 157 of intermediate or cover-up shutter lever 142 and thereby transmits to it the movement imparted by push button 16. Such movement of control link 155 is guided by stud 144, upon which the intermediate link is pivotally movable, working in a slot 158 formed in this push-button link.

This operating link 155 is extended rearwardly in the form of a blocking member or control projection 159 which enters control slot 102 of ocular cam control member 90 of the view finder system as an exposure is made, provided, however, this control member is in one of its pre-determined positions, which, for purposes of illustration of my invention I show as two only. This arrangement accomplishes two purposes. If slot 102 is not in line with extension 159 inward or operating movement of exposure button 16 is blocked. This slot is in such position only when the ocular of the finder system has been moved to one of a plurality of definite settings of the photographic lens 22. As will later be explained, after a photographer once moves button 16 to picture-taking position it remains in such position until the film has been wound up to bring a fresh "frame" into operative position at the exposure window 33. If a user attempts to change the focus before he has re-set his film he is quickly reminded of that fact because he cannot rotate control member 90. Thus this arrangement first prevents a photographer from making an exposure unless he has focussed the camera by having moved the photographic lens to one of a plurality of predetermined positions; second it prevents him from changing the focus until he has re-set the shutter ready for another exposure, and, third, it provides means by which he can lock his camera against inadvertent exposure by others, as for example children.

By reason of this construction it will be seen that when a user pushes button 16 inwardly he breaks the toggle and moves both the cover-up and exposure shutter through the exposing position thereby taking a picture.

Contrary movement to re-set the shutter is afforded by revolution of a take-up spool to bring a fresh portion of a film into position in the manner claimed in my said co-pending parent application or in my said divisional applications therefrom and herefrom relating to the shutter and will be explained herein.

As will be clearly seen in Figure 5 a film *f* extends from a delivery spool 160 across the exposure aperture 33 (Figure 3) and is wound upon a take-up spool 161. This take-up spool is supported by a shaft 162 which may be revolved as shown in my said parent application as by button 91 thereof or by the devices herein described in connection with the support of top plate 37. As illustrated in that figure and in Figure 13 a cam in the form of a friction or leaf spring 163 supported upon an enlargement 164 of take-up shaft 162 is held in position by a spring clamp 165. Figure 5 shows the parts just after an exposure has been made and before the take-up has been rotated. By reason of this construction revolution of take-up shaft 162 in a counter-clockwise direction as viewed in the figures and as shown by the arrows of Figures 5 and 13 when the parts of the shutter-control mechanism are in the above after-exposure position of Figure 5 brings cam 163 against the inner side of lip 146. As revolution of shaft 162 is continued in order further to feed the film into proper position for another exposure it will force the shutter control mechanism from the position of Figure 5 to that of Figures 4 and 13 thus in a manner later explained resetting the shutter preparatory to another exposure and winding up the film which has just been exposed.

I have now described the structure of my shutter control and the button which actuates it and the take-up device which re-sets it as a film is taken up and will now present the mode of operation first of my shutter exposing mechanism and then of my shutter re-setting and film re-winding device. It will be assumed that the take-up or film winding mechanism has been operated to re-set the shutter and that the parts are disposed in the position shown in Figures 4 and 13, the cam-spring 163 being in the dotted line position of Figure 13. With the parts so disposed a fresh frame of film has been placed opposite the exposure window 33. (With the cam in the full line position of Figure 13 the shutter has been set but the film not fully wound, as later described.) Control member 90 is positioned so that one of the iris openings is aligned with the photographic lens; otherwise the parts could have been moved to this position, as is later explained. Thus the camera is ready for a picture to be taken.

When the push button link 16—155 is operated by being moved inwardly parallel to the axis of the lens through pin 156 and slot 157 it moves the intermediate or cover-up link 142. Almost instantly lip 152 of link 142 is moved to a position to the left of lip 134, as viewed in the drawings, of the primary shutter lever 131 thus blocking movement of lever 131 (in a clockwise direction). Thus the shutter lever and the exposure shutter 127 attached thereto are held motionless while further movement of lever 142 under impulsion of button 16 increases the tension upon spring 137. When this movement has progressed to the point that the cover-up shutter 129 attached to lever 142 has cleared the lens, which at this point is blocked only by an opaque portion of the exposure shutter blade, lip 152 of the cover-up link 142 passes beyond the edge of lip 134 of the primary link 131 and releases that link so that as the toggle is broken and the full power of spring 137 is applied to the shutter lever 131 and the shutter plate 127 which is attached thereto. The exposure is therefore made as opening 128 passes in front of the lens. The shutter as it is thus released is always under the same tension since the spring is pulled the same distance and in the same direction each time the push button is operated. Since the actual movement of the shutter blade is completely beyond the control of a user he cannot interfere with the proper timing of the exposure.

After the exposure has thus been made the shutter control mechanism will be in the position shown in Figure 5. Lip 147 now rests against stop or lug 149 and lip 133 rests against the upper portion of stop 154' as viewed in Figure 5. Nothing can be done until the exposed frame is wound upon the take-up spool and a fresh frame thereby moved from the delivery spool.

As take-up shaft 162 is revolved to move a fresh frame into place opposite aperture 33 cam spring 163 is bodily rotated until its leading relatively flat side engages the flat inner side of lip 146. Further rotation causes it to move lever 142 in the direction opposite that in which it is moved by inward movement of button 16 and thereby to re-set the shutter. After a very short initial movement of cover-up lever 142 its lip 153 is disposed to the left of and in alignment with lip 135 (as shown in the drawings) blocking the operation of the primary shutter lever 131 and the re-setting of the shutter until after the coverup shutter 129 has blocked the iris opening. As soon as this protection has been afforded lip 153 moves beyond lip 135, and toggle spring 137 snaps the shutter back into position ready for another exposure after the movement of the film has been completed and disposes the shutter control parts as is seen in Figure 4. Lip 135' then rests against the lower side of boss 154' as viewed in Figure 4.

For a full showing of the several embodiments of my invention whereby I re-set the shutter by the operation of my novel take-up mechanism and for claims thereto per se reference is made to my said co-pending application Serial Number 326,417, filed December 17, 1952, now Patent No. 2,742,835. I shall now explain the operation of this portion of my invention in combination with the shutter-control mechanism the actuation of which has just been described.

After an exposure has been made my cam 163 and lips 146 and 147 of lever 142 are disposed in the position shown in Figure 5. To wind up the film the shaft 162 and with it cam spring 163 are rotated in the direction of the arrow, from the position shown in Figure 5, until its flat and leading side rests against the inner surface of lip 146 and moves lever 142 clockwise as has just been stated. This movement breaks the toggle thereby re-setting the shutter. Further rotation after the shutter has been tripped brings the control cam-spring to the full line position of Figure 13. At this point, therefore, the control cam 163 is disposed in the position it assumes after the take-up button has been rotated sufficiently to re-set the shutter and begin to wind up the film but not sufficiently completely to wind up all the film which has just been exposed. Upon further winding up movement the cam spring 163 passes the upward and leftward face of lip 146 and describes the partial circle indicated by the dotted line until its leading side engages the outward or leftward tip of the lip 147, all as shown in dotted line in Figure 13. With the parts in this position further rotation of take-up shaft 162 to complete the winding of the film is possible because cam spring 163 slips upon enlargement 164 of the take-up shaft. The tension of spring clamp 165 is sufficient to overcome the tension of the toggle 137 of the shutter operating mechanism so that rotation of shaft 162 acting through cam spring 163 re-sets the shutter but insufficient to prevent the rotation of shaft 162 after the cam spring has engaged positively the leftward end of lip 147. Thus the cam spring is held motionless during further rotation of the take-up shaft in a winding up direction. It will be noted that the relative angles between the inside of lip 146 and the operative portion of cam spring 163 are such that the full force of the cam operating on a short radius as it is first rotated under the influence of shaft 162 is brought to bear upon lip 146 until the toggle is broken. Thereupon when the parts assume the position shown in full line in Figure 13 the end of cam 163 is ready to pass the corner of lip 146. When the next exposure is made by movement of button 16 lips 146 and 147 are moved to the position of Figure 5.

As is explained fully in my co-pending parent application last above mentioned since the mass of film upon the take-up spool constantly increases as further exposures are made the number of revolutions necessary to bring a fresh "frame" into position decreases. In order to avoid elaborate and expensive counting mechanism I make use of the conventional number system upon the paper backing the film whereby a user continues to rotate the take-up spool until a number indicating exact alignment of a fresh "frame" at the aperture is seen through the protective window in the rear.

This exposing mechanism immediately hereinabove described is structurally and operationally related to my plate carrying the iris openings which in turn cooperates directly with the finder system in a manner about to be described. As previously noted and as clearly seen in Figure 2 iris plate 51 is supplied with three locking openings 73, 74 and 75 corresponding to the three aperture openings 56, 57 and 58 respectively which for purposes of illustration only are all which I show. I supply linkage between the exposure button 16 and these openings which makes it imposible for the shutter to be operated and a film exposed unless the iris plate is disposed in one of its several operative positions. This arrangement prevents a user from attempting to take a picture before he has properly arranged the light-admitting opening in relation to the lens. Moreover the opening cannot be changed until the film has been moved ready for another exposure. Thus a warning signal is given to a photographer just before he makes the exposure to be certain that he has set the iris opening as conditions then existing demand. This control is exercised by means of an irregularly shaped locking control rod 170 the forward end of which is aligned with the several openings and small enough to pass therewithin. It operates through and is guided by an appropriate opening 171 in the mask plate 85 for the finder lens holder.

The rearward end of this locking rod is curved upwardly and attached to and movable by a locking lever 172 pivoted on a pin 173. Pin 173 also serves in co-operation with pin 174 to locate the guideways 121 for the exposure and cover-up shutters by passing through appropriate openings in the supporting flanges. The other or forward end of this guideway is held in position by boss 11 (Figures 1 and 3) and by ribs 173' and 174' extending inwardly from walls 12 and 13 respectively of the outer casing (Figures 2, 4 and 8). Thus assembly of this sub-combination of my camera is quick and easy. This lever 172 is turned upwardly to form or carries an upstanding pin 175 operating in an opening 176 in primary operating lever 155 of the control system, this lever being an extension of push button 16. By reason of this construction it will be seen that if an attempt is made to move control button 16 backwardly in order to make an exposure at a time when the forward end of locking rod 170 is disposed opposite a solid portion of the iris plate between openings 73, 74 and 75 the exposing mechanism will be blocked so that it is impossible to make an exposure. If, however, locking rod 170 is free to enter one of these openings the control linkage can be operated and a photograph made.

From an examination of Figures 4 and 5 it will be seen that intermediate shutter operating lever 131 is provided with an upstanding and off-set flange 136 which extends forwardly and toward the right as viewed in those figures. After exposure-control button 16 is pushed backwardly so that an exposure is made this flange moves from the position of Figure 4 to that of Figure 5 wherein it obscures the scene in the view finder system. When, however, the mechanism is disposed in picture-taking position as shown in Figure 4, with the shutter reset and the ex- posed film wound up and a fresh frame in position, the view through the finder system is unobstructed thereby. I thus provide a visual signalling instrumentality within the view finder lens system so that a user can readily determine whether or not the apparatus is in proper position to make an exposure and receive a clear warning if it is not. This positive blocking of the view finder system is a most complete and effective warning.

There remains a description of the mechanism whereby the top 37 and the take-up button carried thereby are attached to the remainder of the camera and an explanation of how the entire mechanism is assembled, provision of a structure which makes possible this economical and efficient mode of operation being one of the important objects of this invention.

As will be clearly seen in Figure 11 the enlargement 164 of take-up shaft 162 includes a bayonet connection 180 adapted to interfit with upwardly extending prongs 181 of take-up spool 161. This shaft 162 extends upwardly through an appropriate opening in top plate 37. Reverse winding is prevented by a wire spring 182 coiled about the shaft. A take-up knob 183 held at 184 at the top of this shaft furnishes a convenient finger-hold by which a user is able to wind up the film f. The delivery and take-up spools are held in position by the ends of a leaf spring 185. Shaft knob and spring are assembled upon the cover plate. The portion which holds the delivery spool 160 in place is not shown but is constructed similarly to that which is applied to the take-up spool. Bosses with central openings are disposed below these ends of spring 185, that 187 for the take-up spool being shown in Figure 11. A rivet, not shown, in the center of this spring supports it upon the bottom wall 17. The mounting of the delivery spool 160 will be clear from the foregoing. An opening 188 (Figure 5) receives a pin 189 on the top of the spool, and the lower end is supported by the other end of the spring 185 the take-up end of which is shown in Figure 11.

Figure 11 also shows my novel supporting, tensioning and guiding spring 186. As will be noted this spring, which is supported upon an adjacent side of the casing by a connection not shown, has an upper off-set portion which bears against the edge of the upper rim or side of take-up spool 161 and a lower portion which bears against the paper backing of the film f as it is wound upon the take-up spool 161 and a lower portion which bears against the paper backing of the film f as it is wound upon the take-up spool. As a matter of practice I have found that this off-set upper portion of this single spring furnishes sufficient support, guidance and tension so that I may dispense with spring 185, and depend for the positioning of the lower portion of a take-up spool upon an opening 187. As spool 161 is revolved the tension of this spring as it bears against the paper backing is sufficient to hold the film in proper alignment and also simultaneously to apply enough lateral tension so that the film is wound tightly upon the shaft of the spool. For details of this arrangement reference is made to my co-pending application, Serial Number 326,418, filed December 17, 1952.

From the foregoing description it will be seen that to place a fresh film in position a user merely separates the bottom wall 17 from the unit which makes up the entire top portion of the camera including the side walls and places the fresh film upon the delivery end of the spring 185. Movement of pins 45 and 56 unlocks and later locks the two parts together. An empty takeup spool is thereupon placed in position and the film threaded in the usual manner across the exposure aperture 33. Before the cover 17 is replaced a user rotates the spool, if necessary, to cause the bayonet lock 180 and the prongs 181 to engage.

The assembly of top place 37 and the remainder of the camera is most simple. See Figure 12. As described in connection with Figure 5 bosses 150 and 151 rise from the upper plane of intermediate wall 26 of plate 19. The top wall opposite these bosses is formed with oppositely disposed similar indentations of which only one 190 is shown. A fastening device or bracket 191 having an opening for the reception of a screw 192 (or a rivet) and a ring 193 to which is attached a larger ring 194 fits within these openings. The construction upon the other or rightward side as viewed in Figure 5 is the same. A holding cord or strap 195 or other support is passed between the ring 194 and the corresponding ring on the other side. After the bracket 191 has been positioned assembly of the top is completed by screws or rivets 192.

As previously stated a most important element of my invention is reduction of cost and complexity of assembly and consequent decrease in the price of my camera, with operation made more certain and effective.

My entire instrument is based upon two supporting and enclosing members—the multi-purposed plate and the front panel. With the exception of the take-up button and the bearing spring for the optical control member, which are mounted upon the cover or top plate, and the lock for the bottom plate literally all of the operable parts are mounted upon these members. As previously stated this one integral supporting and enclosing member which accomplishes many purposes provides a portion of the front wall of the casing, attachments for the front panel and top and bottom plates and in addition forms the entire enclosing back wall and side walls with their characteristic protuberances and T shape. This single plate also furnishes a common wall for the viewing and dark chambers. All of the shutter operating parts are mounted upon the top of the common wall portion 26 together with vital parts of the take-up and re-setting mechanism, all out of the line of sight between the viewing lenses and all shown in a horizontal plane. The operating ends of the resilient shutter blades are attached in a plane parallel to this plane to the shutter operating mechanism while the light obscuring ends are disposed in a plane parallel to and adjacent the vertical plane of the front portion 19", the resilient shutter blades extending in an arc between these horizontal and vertical planes which intersect at substantially a right angle with the arcuate guideway positioned upon this plate with its ends adjacent these two planes. This plate also establishes the focal plane of the film and the position of the lens. Backwardly facing boss 30, with assistance from plate 31, establishes that plane, which is vertical, while vertical and parallel front portion 19" supports the lens.

To assemble the camera the various shutter operating parts are mounted on this common wall of the two chambers and the exposing and cover-up blades are placed in their guideways, which are then slipped onto pins 173 and 174 rising from this top wall. Upon assembly the guideways are held in place by the front panel lip 89 formed in the end of mask 85, ribs 173' and 174' of the side wall portions of this plate 19, and boss 11 of the front camera.

The assembly of the lens is also most simple. First the lens 22 is placed within its carrier 21. Then control rod 24 is attached to the carrier. Next retaining clamp 23 by its wings 23' is snapped in position. Thereupon this unit is slipped into place, the rod 106 extending through its groove 110. Control cam 90, in which the ocular 98 has already been mounted by spring ring 101, is placed in opening 95, with the upstanding end 107 of this rod within its slot 104. All of these operations are carried out entirely without tools. The assembly of all of these parts upon this one plate is a matter literally of a few seconds.

Front panel 10 carries the iris plate 51 together with the finger piece 52—53, finder lenses 82—83 and plate 85, this assembly including only two operations requiring simple operation by hand tools, no fixture or jigs being necessary. Thereupon this front panel is placed in position, with upstanding lug 25 of the inner support extending within opening 26 of the front panel. As the panel is moved backwardly into an entirely vertical position the lower wings 88 and 89 of this finder mask plate bear against the guideway 121 and the lower boss 11 bears against the lower portion of iris plate 51. The remaining step is merely to place cover 37 in position with lug 38 falling within notch 38' and the rear depending formation 96 bearing against the top of inner extension 94 of the optical control member 90 and the leaf spring 111, which previously has been slipped in place in lug 112 with its bowed rightward end (as viewed in Figure 3) guided between lugs 113 bearing against an inward edge of control member 90. Thereupon screws 192 (or rivets) are put into position. A user thereupon places a film in the camera, attaches the upper and lower components of the camera by means of locking plate 43 and its associated parts, as of course he must every time he wishes to put in a new roll, and is ready to take a picture.

As clearly shown in Figure 14 I provide an iris plate 201 similar to iris plate 51 previously described and illustrated. This plate is mounted for pivotal movement upon an attaching member 202 similar to 54 and may be rotated through its several operable positions by a combined finger member and indicator similar to 52, both of these members previously having been described. Since such construction and the operation resulting therefrom are similar to those previously set out it is not necessary to repeat that portion of the description. I provide iris openings 203, 204 and 205 similar to 56, 57 and 58 (Figure 2) and an opaque portion 206 having a function similar to that of opaque portion 59 to cooperate with a lens 207. Locking openings and a detent spring are similarly included but their description is not repeated A finder mask plate 210 with tabs 211 by which it can be fastened to a camera at the front thereof is provided with a central viewing area 213, a view framing rectangular opening 214 surrounding the viewing opening, an indicating or signalling opening semi-circular in cross section 215 through which various indicia are visible, and side photometric sighting areas 216 and 217 covered by filters as later described. The central viewing area 213 represents the field of the camera lens and the framing area, as its name implied, covers the adjacent field. So the user will see the exact limits of the scene to be photographed, I place a filter 218, preferably blue, over the framing area. Its presence enables the user better to compose the scene. The use of the filter over the entire marginal area clearly differentiates the scene to be photographed from its surroundings and also subordinates the surrounding area, outside of the range of the picture, to that which will be included, thus psychologically assisting the photographer in his composition. Photometric areas 216 and 217 are covered with filters of different light-retarding characteristics, as previously described in connection with sheets 77 and 78 illustrated in Figure 2 and described in connection therewith. One, say for purposes of illustration which represents an impinging light necessary for a proper exposure at f8, covers the photometric opening 216 and another, which represents a proper exposure for f11, covers opening 217. The filter covering the opening 217 representing the smaller lens opening will be the more nearly opaque. If the user does not see the image clearly through the opening representing the lens setting then in effect he will of course know that he does not have enough light at that setting and must open the lens more widely so that more light will reach the film.

I form a top or upper portion of iris plate 201 with various signalling instrumentalities which correspond in purpose to those previously described and are easily visible through signalling opening 215, over the lower portion of which there is no filter, in order to indicate what iris opening is at the moment in line with a photographic lens 207. To the leftward as viewed in the drawings, along the edge of the iris plate, I provide an open space indicated as 221. Further to the right I position a tab 222 and thereafter an open space 223 followed by another opaque portion 224. By considering Figures 14, 15, 16 and 17 it will be readily seen that as this plate is rotated in a counter-clockwise direction as viewed in these figures these open spaces or tabs successively will be disposed in operative relation to the sighting aperture 215. As plate 201 is placed in the position of Figure 14 the sighting aperture 215 is wholly free thus indicating to a photographer that the opening 203 (corresponding to 56 of Figure 2 and suitable for exposing color or other film of a relatively slow emulsion) is positioned before the photographic lens. Attention is especially directed to the fact that a user secures all of this information through the view finder lens system. Rotation of the iris plate to the position of Figure 15 brings tab 222 in front of the leftward portion of the sighting opening as seen in that figure (rightward as viewed by the photographer through the ocular) thus indicating that iris opening 204 is before the photographic lens restricting the amount of light reaching it. Further counter-clockwise rotation of the iris plate (as viewed in the figures) to the position shown in Figure 16 brings the relatively adjacent side of opaque portion 224 into the opposite or rightward side as viewed in the drawings (leftward as viewed by the photographer through the ocular) of the sighting opening thus indicating that aperture 205 is in operative position. Counter-clockwise rotation of this plate to the position of Figure 17 brings all of opaque portion 224 across the sighting opening, thus signalling to the photographer as he looks through the finder lens system that the lens opening has been closed by solid portion 206 of the iris plate thus preventing an exposure. For simplicity, I am not showing my various filters in Figures 12, 13 and 14, but it will be understood that they are employed therein.

It must be understood that the particular arrangement of tabs visible in this viewing opening as he looks through the ocular is for purposes of illustrating only one code of signals, which I have found effective, and that others may be used within the ambit of this phase of my invention.

Figure 18 shows a further modification of this general feature of my invention wherein I provide an iris plate 231 rotatable as upon a pivot 232 and having openings 233, 234 and 235 for cooperation with a photographic lens 207' corresponding to those previously described, these openings being suitable to the exposure respectively of a color or very slow film, one requiring a light-admitting aperture of f11 for purposes of illustration only, a third opening corresponding to f8, and a further opaque portion 236 indicating that the camera is closed while the lens and the interior of the camera are protected against dust or an inquiring finger applied through a front aperture of the camera. Movement of this iris plate may be carried out as above described.

At the top portion of iris plate 231 I provide a cut-away portion 240, indicating maximum opening of the lens, as for color; a cut-out figure "11" 241, indicating an exposure for an example only of f11; a similar cut-out figure "8" 242, indicating an exposure of that degree; and an opaque portion 243, indicating a closed position. I provide a mask 251 as previously described with supporting tabs 252 and a central or sighting portion 253 and a circular signalling sight portion 254 for cooperation respectively with the open space, the Figures 11 and 8 and the opaque portion indicating a closed lens. It will be readily understood that rotation of this plate in the manner previously described will bring these various portions into the sighting aperture thus making clear to a user the relation of the aperture to the lens.

I provide a filter 255, preferably blue, which frames the pictorial sighting or viewing opening 253 and also covers side semi-circular photometric or light-determining opening 257 but does not obscure signalling opening 254.

I thus provide within the regular mask a color frame which gives a photographer a better opportunity to compose the picture. The degree of opacity of this filter sheet over opening 257, similarly to that over 216, is such that a user observing objects just beyond the field of the lens through opening 257 will be able to calculate whether or not there is sufficient light for an exposure say of color film or for a film of ordinary speed with an aperture setting of f11. This opening may be covered by the same framing filter (or one of the same density) as are the margins of the viewing opening. This density is calculated as that appropriate to a photographic lens opening which will give proper exposure at medium light admittance, say f8. In order to complete the effects of an extinction photometer I cover light-determining opening 258 by a filter of the same color (preferably blue) but of greater opacity representing the amount of light necessary for a correct exposure at a smaller opening, say f11. Operation of this embodiment of my invention will be clear from the previous portion of this specification. Rotation of the iris plate successively brings each signal into the view finder lens system thus clearly indicating to the photographer the status of the photographic lens at that moment so far as admission of light to a film is concerned.

The advantages of my invention will be made apparent from the foregoing portion of this specification, the attached drawings and the subjoined claims. These advantages include a provision of an improved camera which is highly simplified and inexpensive but has the characteristics previously found, if at all, only in instruments which could be made only at a much higher cost. Other advantages include the provision of devices both alone and in close cooperation provide certainty and ease of photography at low cost.

I claim:

1. In a camera, supports for a film, a photographic lens for directing light upon the film, focussing mechanism for moving said lens along its principal axis, a viewing system adjustable for overcoming parallax for establishing the field of said photographic lens, a shutter for said lens, releasable and re-settable mechanism for operating said shutter, an iris plate revoluble successively to bring each of a plurality of different sized openings before said lens, indicia carried by said iris plate and upon the revolution of said plate successively visible in said viewing system to show the one of said openings then in alignment with said photographic lens, an operating connection between said viewing system and said focussing mechanism, means for preventing the adjustment of said viewing system, means for disabling said focussing mechanism, means for blocking sight through said viewing system, means for blocking the releasing of said shutter operating mechanism, means for blocking the re-setting of said shutter operating mechanism, means for blocking the revolution of said iris plate, and control mechanism having instrumentalities operatively interconnecting all of said means for operating each thereof in pre-determined relation to the operation of each of the others thereof.

2. In a camera, supports for a film, a photographic lens for directing light upon the film, focussing mechanism for moving said lens along its principal axis, a viewing system adjustable for overcoming parallax for establishing the field of said photographic lens, a shutter for said lens, releasable and re-settable mechanism for operating said shutter, an iris plate revoluble successively to bring each of a plurality of different sized openings before said lens, indicia carried by said iris plate and upon the revolution of said plate successively visible in said viewing system to show the one of said openings then in alignment with said photographic lens, means for blocking sight through said viewing system, mean for blocking the revolution of said iris plate, and control mechanism having instrumentalities operatively connecting all of said means for operating each thereof in pre-determined relation to the operation of each of the others thereof.

3. In a camera, a delivery support for a film, a photographic lens for directing light upon the film, focusing mechanism for moving said lens along its principal axis, a viewing system adjustable for overcoming parallax for establishing the field of said photographic lens, a shutter for said lens, releasable and re-settable mechanism for operating said shutter, a take-up for winding up the film after it has been exposed, an iris plate revoluble successively to bring each of a plurality of different sized openings before said lens, indicia carried by said iris plate and visible in said viewing system to show the one of said openings then in alignment with said photographic lens, an operating connection between said viewing system and said focusing mechanism, means for preventing the adjustment of said viewing system, means for disabling said focusing mechanism, means for blocking sight through said viewing system, means for blocking the releasing of said shutter operating mechanism, means for blocking the re-setting of said shutter operating mechanism, means for blocking the revolution of said iris plate, control mechanism having instrumentalities operatively connecting all of said means for operating each thereof in pre-determined relation to the operation of each of the others thereof, an actuating member for said control mechanism for operating said instrumentalities in one sense, and a connection between said take-up and said control mechanism for operating said instrumentalities in the opposite sense.

4. In a camera, a delivery support for a film, a photographic lens for the film, focusing means for said lens, a viewing system adjustable for overcoming parallax for establishing the field of said photographic lens, an operating connection between said viewing system and said focusing mechanism, a shutter for said lens, releasable and re-settable mechanism for operating said shutter movable between a first position wherein said shutter is set and a second position wherein said shutter has been operated and an exposure made, an iris plate revoluble successively to bring each of a plurality of different sized openings before said lens, indicia carried by said iris plate and visible in said viewing system to show the one of said openings then in alignment with said photographic lens, a control button for releasing said mechanism for actuating its movement from said first to said second position, a take-up for winding up the film after it has been exposed, an operating connection between said take-up and said mechanism for re-setting said mechanism by actuating its movement from said second back to said first position, such movement of said mechanism re-setting said control button so that it again can be operated, an operative connection between said shutter-operating mechanism and said iris plate which locks said shutter-operating mechanism against movement from said first to said second position except when an opening in said iris plate is in alignment with said lens and locks said iris plate against movement when said mechanism is in said second position, means operated by said mechanism for disabling said operating connection between said viewing system and said focusing means except when said mechanism is in said first position, an operating connection between said mechanism and said focusing means for disabling said focusing means when said mechanism is in said second position, and a member carried by said mechanism which blocks sight through said viewing system when said mechanism is in said second position.

5. In a camera, a delivery support for a film, a photographic lens for the film, focusing means for said lens, a shutter for said lens, releasable and re-settable mechanism for operating said shutter movable between a first position wherein said shutter is set and a second position wherein said shutter has been operated and an exposure made, an iris plate revoluble successively to bring each of a plurality of different sized openings before said lens, indicia carried by said iris plate and visible in said viewing system to show the one of said openings then in alignment with said photographic lens, a control button for releasing said mechanism for actuating its movement from said first to said second position, a take-up for winding up the film after it has been exposed, an operating connection between said take-up and said mechanism for re-setting said mechanism by actuating its movement from said second back to said first position, such movement of said mechanism re-setting said control button so that it again can be operated, an operative connection between said shutter-operating mechanism and said iris plate which locks said shutter-operating mechanism against movement from said first to said second position except when an opening in said iris plate is in alignment with said lens and locks said iris plate against movement when said mechanism is in said second position, and an operating connection between said mechanism and said focussing means for disabling said focusing means when said mechanism is in said second position.

6. In a film handling apparatus, an enclosing casing, a lens carried by said casing, a rotatable lens control member on a wall of said casing, a connection between said lens control member and said lens for moving said lens along its principal optical axis into any one of a plurality of pre-determined focus settings, a viewing system; said viewing system comprising an ocular lens eccentrically mounted in said lens control member, the rotation of said control member moving said ocular lens in a plane normal to said axis of said photographic lens, and an objective viewing lens mounted in alignment with said ocular lens, rotation of said lens control member thereby minimizing parallax; a mount for a film in line with said photographic lens, a shutter for said lens, take-up means for the film, mechanism for operating said shutter; said shutter mechanism including a control button operable from the exterior of said casing, a link operated by said button, and a lever connected to said link and movable by the movement of said link; a sight-blocking member carried by said shutter operating mechanism and upon the operation thereof disposed between said ocular and objective lens of said viewing system; a movable iris plate embodying openings of different sizes for changing the amount of light passing through said lens, said iris plate being formed with a plurality of control openings spaced from said light-admitting openings therein and corresponding thereto, a rod attached to and movable by said lever toward said iris plate with the movement of said shutter operating mechanism, the diameter of said rod being less than the diameter of said control openings, the movement of said plate to bring each one of said iris openings in alignment with said lens being effective to bring its corresponding control opening in line with the end of said rod, whereby when said rod and control openings are not aligned said rod can not enter a control opening and the operation of said shutter mechanism and hence of said shutter is blocked and when one of said iris openings is aligned with one of said control openings said rod thereupon passes within said control opening thereby freeing said shutter mechanism, the position of said rod within said control opening after such exposure preventing the movement of said iris plate, indicia mounted upon said iris plate and upon revolution thereof movable into position between said finder lenses, the particular one thereof in such position representing the light-admitting opening then aligned with said lens; a blocking extension from said link, cooperating formations upon said lens control member and said extension so formed and disposed that they engage to prevent the operation of said button and hence said shutter unless said focussing means has been operated to dispose said lens in one of said settings and that they lock said lens control member upon the operation of said shutter, and a connection between said take-up means and said link for operating said lever in the opposite direction upon the winding up of the film thereby withdrawing said rod from said control openings and hence again permitting the adjustment of said iris plate and withdrawing said blocking extension from said lens control member thereby permitting the movement of said photographic lens and the adjustment of said viewing system against parallax and also withdrawing said sight-blocking member from said viewing system.

7. In a camera, a lens, operable mechanism for moving said lens for focussing the camera, a shutter, mechanism for releasing said shutter, operable means for re-setting said shutter after it has been released, and connections between said means and both of said mechanisms for blocking both of said mechanisms until said means has been operated.

8. In a camera, means for supporting a film therewithin, a lens for directing light upon the film, means for moving said lens to a plurality of different pre-determined positions relative to the plane of said film to focus an image upon the film, a releasable shutter for alternatively opening and closing said lens so that the film may be exposed, operating mechanism including a button operable from the exterior of said camera for releasing said shutter, means for re-setting said shutter, and mechanism for blocking and unblocking both said shutter operating mechanism and said lens moving means, said blocking mechanism including cooperating formations upon said shutter operating mechanism and said lens-operating means so formed and disposed that unless said lens-operating means has been moved to dispose said lens in one of said positions they block operation of said shutter-operating mechanism and that after said shutter has been released they block said lens moving means until said shutter has been re-set.

9. In a camera, a lens, operable means for moving said lens for focussing the camera, a releasable shutter, operable mechanism for releasing and re-setting said shutter alternatively, and connections between said means and mechanism for blocking said means until said mechanism has been operated to re-set said shutter.

10. In a camera, means for supporting a film therewithin, a lens for directing light upon the film, means for adjusting said lens to a plurality of different positions relative to the plane of the film to focus an image upon the film, a re-settable shutter for alternatively opening and closing said lens so that the film may be exposed, operating mechanism for moving said shutter between open and closed positions, means for re-setting said shutter after it has been operated, and mechanism for blocking said lens-moving means so that the adjustment of said lens is prevented, said blocking mechanism including cooperating formations upon said shutter operating mechanism and said lens moving means so disposed that after said shutter has been operated said lens-operating means is blocked until said shutter has been re-set.

11. In a camera, means for supporting a film, a lens for directing light upon the film, mechanism for moving said lens to focus an image upon the film, a shutter for said lens, re-settable mechanism for operating said shutter, means for releasing said mechanism whereby said shutter exposes the film, means for re-setting said shutter, formations upon said shutter releasing means and said focusing mechanism respectively which after said shutter has been released cooperate with each other to lock said focusing mechanism against movement, and an operative connection between said shutter-re-setting means and one of said formations for withdrawing it from locking relation to the other thereof when said shutter has been re-set.

12. In a camera, means for supporting a film therewithin, a lens for directing light upon the film, means for exposing a frame of the film, focus adjusting means for moving said lens, means for winding up the film after a frame thereof has been exposed, and an operative connection between said film winding up means and said focusing means for disabling said focusing means until said film winding up means has been operated.

13. In a camera, means for supporting a film therewithin, a lens for directing light upon the film, means for moving said lens to focus an image upon the film, a shutter for alternatively opening and closing said lens to expose the film, operating mechanism for alternatively releasing and re-setting said shutter, a member for operating said shutter to release it, means for winding up the film after it has been so exposed, a connection between said film winding up means and said mechanism for operating said mechanism to re-set said shutter, a member for disabling said focusing means, and a connection between said shutter operating mechanism and said disabling member for operating said disabling member by the release of said shutter and rendering said disabling means ineffective by the re-setting operation.

14. In a camera, an outer protective casing, means for supporting a film therewithin, a lens for directing light upon the film, a control member for moving said lens to focus an image upon the film, mechanism for opening said lens and thereafter closing it for exposing the film, said mechanism including a button extending without said casing and an operating link within said casing, said link having a blocking extension, an operable control member for said lens, a connection between said lens control member and said lens for moving said lens for focusing, the operation of said button to make the exposure moving said blocking extension into blocking relation with said lens control member, means for winding up the film, and a connection between said winding up means and said operating link for moving said operating link to remove its extension from blocking relation to said control member upon the operation of said winding up means to wind up the film after an exposure whereby said lens control member can again be operated.

15. In a camera, an outer protective casing, means for supporting a film therewithin, a lens for directing light upon the film, means for moving said lens to focus an image upon the film, mechanism for opening said lens for exposing the film to an image and thereafter closing it, said mechanism including a button extending without said casing and an operating link within said casing, a blocking projection from said link, a rotatable control member for said lens movable into any one of a plurality of different focus positions, a connection between said lens control member and said lens for moving said lens upon the movement of said control member, said member being formed with a plurality of slots movable into alignment with said blocking projection when said member is moved to bring said lens into any one of said focus positions, the operation of said button to make the exposure moving said projection into one of said slots provided said button has been moved to bring said lens into one of said pre-determined positions, means for winding up the film, and a connection between said winding up means and said operating link for moving said operating link to remove its projection from said slot upon the operation of said winding up means to wind up the film after an exposure, the coaction of said projection and said slot when said control member is disposed in one of said pre-determined positions preventing the movement of said member and hence said lens until said winding up means has been operated.

16. In a camera, a lens, operable means for moving said lens to any one of a number of positions for focusing the camera, a shutter, mechanism for operating said shutter, and connections between said means and mechanism for blocking the operation of said mechanism unless said means has been operated to dispose said lens in one of said positions.

17. In a camera, means for supporting a film, a lens for directing light upon the film, a lens control member rotatable to a plurality of different positions representing different pre-determined focus-settings of the camera, a connection between said rotatable member and said lens for moving said lens to any one of said positions, a shutter for alternatively opening and closing said lens so that light passes therethrough to the film, a control button operable from the exterior of the camera for operating said shutter, linkage between said control button and said shutter for operating said shutter upon the movement of said control button, a blocking member movable with said control button, and formations movable with said lens control member and so disposed and positioned that they cooperate with said blocking member to prevent the operation of said shutter linkage except when said lens control member has been rotated to one of said positions corresponding to one of said settings for said lens.

18. In a camera, means for supporting a film, a lens for directing light upon the film, a lens control member rotatable to any one of a plurality of different pre-determined positions representing different focus-settings of said camera, a connection between said lens and said control member for moving said lens in accordance with the position of said control member, a shutter for alternatively opening and closing said lens so that light passes therethrough to the film, mechanism for operating said shutter, said mechanism including a shutter control button operable from the exterior of the camera, linkage between said control button and said shutter for operating said shutter to expose said lens, said linkage including a blocking member extending from said shutter control button toward said lens control member, said lens control member having a plurality of slots extending toward said blocking member for the reception of a portion of said blocking member, each of said slots corresponding to one of said pre-determined lens positions, the imperforate surfaces between said slots being so disposed and positioned that when they are in alignment with said blocking member said control button cannot be operated thereby preventing the operation of said shutter and said intervening slots being so disposed that when said slots are in such alignment said blocking member passes therewithin when said shutter button is operated thereby preventing subsequent operation of said lens control member.

19. In a camera, means for supporting a film therewithin, a lens for directing an image upon the film, mechanism for moving said lens to a plurality of pre-determined positions for focusing the camera, a shutter for alternatively opening and closing said lens for exposing the film to light from said lens, mechanism for operating said shutter to make an exposure, a locking connection between said shutter operating mechanism and said lens-moving mechanism for locking said shutter against movement except when said lens is disposed in one of said pre-determined positions, means for winding up the film after such exposure, means for re-setting said shutter, and an operative interconnection between said re-setting means and said locking connection for disabling said locking connection after the film has been wound up and the shutter re-set.

20. In a camera, a photographic lens, a shutter for said lens, mechanism including instrumentalities which first release said shutter to make an exposure and thereafter re-set said shutter preparatory to another exposure, supports for a film in line with said lens, a member for moving said lens to focus the camera, a finder lens system, means operatively connected to said lens control member for adjusting said finder lens system to minimize parallax, a take-up for winding up the film after an exposure has been made, blocking mechanism operated by said shutter mechanism for disabling said adjusting means after said shutter mechanism has been operated, and an operating connection between said take-up and said blocking mechanism for disabling said blocking mechanism after the film has been wound up after an exposure has been made.

21. In a camera, an outer protective casing, means for supporting a film therewithin, a photographic lens for directing light upon the film, means for moving said lens along its principal optical axis to focus an image upon the film, mechanism for opening said lens and thereafter closing it for exposing the film, said mechanism including a button extending without said casing and an operating link within said casing, a blocking projection from said link, a finder lens system, said system including an ocular lens and an objective lens aligned with each other and a viewing chamber therebetween, a control member for said photographic lens movable into any one of a plurality of different focus positions, said ocular finder lens being mounted eccentrically upon said control member, said control member being mounted for rotation upon a fixed axis, a cam slot in said control member, a connection including a follower in said cam slot between said control member and said lens for moving said photographic lens along its said axis upon the movement of said control member, such rotation of said control member moving said ocular lens in a plane normal to the principal axis of said photographic lens whereby the effects of parallax are minimized as the focus is changed, said lens control member being formed with a plurality of slots movable into alignment with said projection when said lens control member is moved to bring said lens into any one of said focus positions, the operation of said button to make the exposure moving said projection into one of said slots provided said button has been moved to bring said lens into one of said pre-determined positions, surfaces between said slots blocking the movement of said projection and hence of said mechanism, means for winding up the film, and a connection between said winding up means and said operating link for moving said operating link to remove its projection from said slot upon the operation of said winding up means to wind up the film after an exposure, the coaction of said projection and said slot when said control member is disposed in one of said pre-determined positions preventing the movement of said member and hence of said photographic and ocular lenses until said winding up means has been operated.

22. In a camera, an outer protective casing, means for supporting a film therewithin, a photographic lens for directing light upon the film, a finder lens system, said finder lens system comprising a fixedly mounted objective finder lens and a rearwardly disposed ocular lens, a control mount for said ocular lens the movement of which moves said ocular lens in a plane normal to the principal axis of said photographic lens, a connection between said control mount and said photographic lens for moving said photographic lens along its principal axis thereby focusing an image upon the film, the movement as aforesaid of said ocular mount changing the field of said finder system thereby reducing parallax in accordance with such change of focus, a shutter for alternatively opening and closing said lens, a system of levers for operating said shutter, a button extending to the exterior of said casing for operating said lever system to make an exposure, said lever system including a blocking extension movable to a position wherein it prevents the movement of said control mount after an exposure has been made, said lever system also including a sight-blocking extension movable into position between said ocular and objective lens when said shutter has been operated, means for winding up the film after an exposure has been made, and a connection between said lever system and said winding up means which upon the operation of said winding up means re-sets said shutter ready for another exposure and moves said blocking extension from blocking relation with said control mount whereby said photographic lens may again be moved to change the focus of an image and said sight-blocking extension from between said finder lenses thereby signalling a user that the camera is again operable.

23. In a camera, a lens, operable mechanism for moving said lens for focusing the camera, a releasable shutter, operable means for re-setting said shutter after it has been released, iris mechanism for selectively changing the amount of light reaching said lens when said shutter is operated, and connections between said means and both of said mechanisms for blocking operation of both of said mechanisms until said means have been operated.

24. In a camera, a lens, operable mechanism for moving said lens to a plurality of pre-determined positions for focussing the camera, a releasable shutter, mechanism for releasing said shutter, operable means for re-setting said shutter after it has been released, iris means having openings movable into alignment with said lens for selectively changing the amount of light reaching said lens when said shutter is operated, and connections between both of said mechanisms and said iris means for blocking both of said mechanisms unless said iris means is disposed with one of said openings in alignment with said lens and said mechanism is disposed in one of said positions.

25. In a camera, an enclosing casing, a lens carried by said casing, focussing means for moving said lens into any one of a plurality of pre-determined focus settings, a movable control member for said focussing means, means for mounting a film within said casing in line with said lens, a shutter for alternatively opening and closing said lens, means for winding up the film after an exposure, a movable iris plate in operative relation to said lens and embodying opening of different sizes for changing the amount of light passing through said lens, mechanism for operating said shutter; said shutter mechanism including a control button operable from the exterior of said casing, a link operated by said button and a lever connected to said link and movable by the movement of said link; said iris plate being formed with a plurality of control openings spaced from said light-admitting openings therein, a rod attached to said lever and movable thereby whereby the movement of said control button moves said rod, said rod extending to a point adjacent said iris plate and movable toward said iris plate with the movement of said shutter operating mechanism, the diameter of said rod being less than the diameter of said control openings, the movement of said plate to bring each one of said iris openings in alignment with said lens being effective to bring its corresponding control opening in line with the end of said rod, whereby the operation of said shutter operating mechanism and hence of said shutter is blocked except when one of said iris openings is aligned with one of said control openings, said rod thereupon passing within said control opening, the position of said rod within said control opening after such exposure preventing the movement of said iris plate; a blocking extension from said link, cooperating formations upon said movable lens control member and said extension so formed and disposed that they engage to prevent the operation of said button and hence said shutter unless said lens control member has been operated to dispose said lens in one of said settings and that they lock said focussing means against movement upon the operation of said shutter (after said lens has been disposed in one of said positions), and a connection between said winding up means and said link of said shutter control mechanism for operating said lever in the opposite direction upon the winding up of the film thereby withdrawing said rod from said control openings and hence again permitting the adjustment of said iris plate and withdrawing said blocking extension from said lens control member permitting free operation of said focussing means.

26. In a camera, an enclosing casing, a lens carried by said casing, means for mounting a film within said casing in line with said lens for exposure by light passing therethrough, a shutter for alternatively opening and closing said lens to the passage of light, a control button operable from the exterior of said casing for operating said shutter, a link attached to said button and movable thereby to operate said shutter, a pivoted lever attached to and movable by said link, a movable iris plate disposed in operative relation to said lens and embodying light-admitting openings of different sizes for changing the amount of light which reaches the film through said lens, said iris plate being formed with a plurality of control openings, one of said control openings corresponding to each of said light-admitting openings, a rod attached to said pivoted lever and movable thereby and extending to a point adjacent said iris plate, the diameter of said rod being less than the diameter of said control openings and the space between said control openings being imperforate, movement of said plate to bring each one of said light-admitting openings in alignment with said lens being effective to bring its corresponding control opening in line with the end of said rod, whereby the operation of said shutter is blocked by said imperforate surfaces except when one of said control openings and its corresponding light-admitting opening is aligned with the lens, said rod then passing within said control opening and permitting the free operation of said shutter.

27. In a camera, a lens, a releasable and re-settable shutter for said lens, mechanism including a control button for releasing said shutter, operable iris means to render a plurality of different pre-determined openings effective upon said lens to change the amount of light passing through said lens, means for re-setting said shutter after it has been operated to make an exposure, a first operative locking connection between said releasing mechanism and said iris means for locking said iris means against operation after an exposure has been made, and a second operative connection between said re-setting means and said first connection for withdrawing said first connection from locking relation to said iris means by the operation of said re-setting means thereby freeing said iris means for operation.

28. In a camera, an enclosing casing, means within said casing for supporting a film, means for winding up the film, a lens for directing light upon the film means for exposing a portion of the film to light through said lens, iris means operable to render a plurality of different openings effective upon said lens to change the amount of light passing through said lens to the film, means for locking said iris means against operation after an exposure has been made, and an operative connection between said winding up means and said locking means for rendering said locking means inoperative upon the winding up of the film.

29. In a camera, an enclosing casing, a lens carried by said casing, means for mounting a film within said casing in line with said lens for exposure by light passing therethrough, means for winding up the film after it has been exposed, a shutter for alternatively opening and closing said lens to the passage of light, means for winding up the film after an exposure has been made, a movable iris plate disposed in operative relation to said lens and embodying openings of different sizes for changing the amount of light which reaches the film through said lens, mechanism for operating said shutter; said shutter mechanism including a control button operable from the exterior of said casing, a link operated by said button and a lever connected to said link and movable by the movement thereof; said iris plate being formed with a plurality of control openings, a rod attached to said lever and movable thereby whereby the movement of said control button moves said rod, said rod extending to a point adjacent said iris plate and movable toward said iris plate by the movement of said shutter operating mechanism, the diameter of said rod being less than the diameter of said control openings, the movement of said plate to bring each one of said iris openings in alignment with said lens being effective to bring its corresponding control opening in line with the end of said rod, whereby the operation of said shutter operating mechanism and hence of said shutter is blocked except when one of said iris openings is aligned with one of said control openings, said rod thereupon passing within said control opening, the position of said rod within said control opening after such exposure thereupon preventing the movement of said iris plate, and a connection between said winding up means and said link of said shutter control mechanism for operating said lever in the opposite direction upon the winding up of the film thereby again permitting the adjustment of said iris plate.

30. In a camera, an outer enclosing casing, said casing including a front wall and a rear wall, a photographic lens disposed adjacent said front wall for focusing movement along its principal axis, said front wall having an opening aligned with said photographic lens, means within said casing for supporting a film to receive an image which is focused thereupon, a finder lens system including an objective lens and an ocular lens aligned with each other, said objective lens being fixedly mounted adjacent said front wall of said casing and angularly spaced from said photographic lens, a mount rotatably movable upon said rear wall, said ocular lens being eccentrically mounted upon said rotational movement, the rotation of said mount thereby moving said ocular lens in a plane normal to said principal axis of said photographic lens whereby the field of said finder lens system is changed, and an operating connection between said amount and said photographic lens through which the movement of said ocular lens in said plane moves said photographic lens along it principal axis to focus an image upon the film.

31. In a camera, an outer enclosing casing, said casing including a front wall and a rear wall, an intermediate inner wall extending forwardly from said rear wall and dividing said camera into a viewing chamber and a dark or photographic chamber side by side, a photographic lens disposed adjacent the front of said dark chamber and movable along its principal axis, said front wall of said casing being formed with an opening aligned with said lens, means within said dark chamber for supporting a film opposite said photographic lens to receive an image which is focused thereupon by the movement of said photographic lens, a finder lens system including an objective lens and an ocular lens, said objective lens being fixedly mounted at the front of said viewing chamber adjacent said front wall of said casing and vertically spaced from said photographic lens, a control cam ocular mount disposed in substantially the plane of said rear wall at the rearward end of said viewing chamber for rotation upon a fixed axis, said ocular lens being eccentrically disposed in said mount, rotation of said mount thereby changing the field of view of said finder lens system by vertical movement of said ocular, a cam slot formed in said control mount, an operating connection including a follower in said slot, said connection extending along said intermediate wall from said slot to said photographic lens whereby the vertical movement of said ocular lens horizontally moves said photographic lens to focus an image upon the film, and indicia upon said back wall indicating the focus position to which the movement of said ocular lens mount or control mount has moved said photographic lens.

32. In a camera, an outer enclosing casing having a front wall and a back wall, an objective viewing lens fixed adjacent said front wall, a movable ocular lens adjacent a rear wall of said casing, a control member mounted in said back wall for rotation upon a fixed axis, said control member having an opening therethrough disposed eccentrically of said mount, a rearwardly extending annular flange, a forwardly extending annular flange, said flanges mounting said control member for rotation upon said back wall, said ocular lens being disposed upon said member in alignment with said opening, whereby the rotation of said mount vertically moves said ocular lens thereby changing the field of view of said finder system, a photographic lens disposed adjacent said front wall, means for supporting a film within said casing, a mount for said photographic lens wherein it is horizontally movable along its principal optical axis to focus an image upon the film, a cam slot in said forwardly extending annular flange of said control member, and a connection between said control member and said mount for said photographic lens, said connection including a follower for said slot, whereby the rotation of said ocular mount changes the vertical relation between said ocular lens and said objective lens and simultaneously moves said photographic lens along its principal optical axis to focus the camera thereby changing the field of view of the finder system to minimize the effects of parallax.

33. In a camera, an outer enclosing casing, said casing including a rear wall and a bottom wall and a top wall and a front panel, a finder lens system, said system including an objective lens mounted adjacent the top of said front panel, said front panel also having a photographic lens opening spaced from said objective lens, a cam control member rotatable upon a fixed axis adjacent the top of said back wall and below the bottom of said top wall at the rear thereof, an ocular lens disposed within said control member eccentrically thereof, said control member and said objective lens being in alignment after said panel has been assembled with said casing, a viewing chamber disposed between said ocular and objective lenses and below said top wall, said control member having an extension inwardly of said casing, a cam slot in said inward extension, means within said casing adjacent said rear wall for supporting a film, a photographic lens disposed adjacent said photographic lens opening in said front panel, a mount for said photographic lens upon which it is movable along its principal optical axis to focus an image upon the film, an operating slot in said photographic lens mount, the back of said ing slot in said photographic lens mount, the back of said bottom wall joining the lower end of said back wall and the forward ends of said bottom and top walls and the upper and lower edges of said front panel having cooperating positioning formations whereby the enclosure of said casing may be quickly completed, and an operating connection between said cam and operating slots, said connection including a follower in said cam slot, the rotation of said mount for said ocular lens bodily moving said ocular lens in a plane normal to said principal axis of said photographic lens, whereby the rotation of said control member moves said ocular lens in said plane as it moves said photographic lens along said axis thereby changing the field of view of the finder system as the focus of the camera is changed thereby minimizing parallax.

34. In a camera, a photographic lens, a view finder system, an iris plate rotatable adjacent said lens, said iris plate having a plurality of openings of various sizes for selective alignment with said photographic lens, and a plurality of light screens of varying densities of an extinction photometer type directly mounted upon and movable with said iris plate, said light screens and openings being so disposed and said plate so mounted that the rotation of said plate successively brings into alignment with said photographic lens the one of said openings which corresponds to the one of said screens then disposed in said view finder system.

35. In a camera, a photographic lens, a finder lens system; said finder lens system comprising a finder chamber, an ocular disposed at the rear of said chamber, an objective lens disposed at the front of said chamber; and an iris plate, said iris plate being mounted upon said camera for revolution relatively thereto and having a series of light-admitting openings of different sizes which are selectively brought into alignment with said photographic lens upon the revolution of said iris plate, a plurality of light modifying instrumentalities of photometric extinction type each appropriate to the photographic requirements of one of said openings mounted upon a portion of said iris plate relatively distant from said openings, said plate and said instrumentalities being so disposed that the revolution of said plate successively brings into alignment with said photographic lens the one of said light-admitting openings corresponding to the one of said instrumentalities then in said viewing chamber between said ocular and objective lenses.

36. In a camera, an outer enclosing casing, a dark chamber within said casing, a photographic lens disposed at the forward side of said dark chamber, a finder lens system; said system comprising an ocular finder lens, an objective finder lens, and a viewing chamber disposed therebetween; a front panel separable from the remainder of the casing, said front panel being adapted for assembly at the front of said casing, said objective finder lens being disposed in a portion of said front panel and said ocular finder lens being disposed in alignment with said objective finder lens and at the rear of said viewing chamber, said front panel at a point therein relatively remote from said ocular lens containing an opening aligned with said photographic lens and said front panel and when assembled with said casing completing said viewing chamber and disposing said finder lenses in alignment, an iris plate mounted upon said front panel for bodily movement therewith and revolution thereon, said iris plate having a series of light-admitting openings of different sizes which upon the rotation of said plate are disposed in alignment with said photographic lens when said panel is mounted upon said casing, a series of light-modifying instrumentalities of an extinction photometric type each corresponding to one of said light-admitting openings, said instrumentalities being so disposed upon said plate that the rotation of said iris plate successively brings the one thereof appropriate to the iris opening then in alignment with said photographic lens into said viewing chamber and into alignment with and between said finder ocular and objective lenses.

37. In a camera, an outer enclosing casing, a dark chamber within said camera, a photographic lens disposed at the forward side of said dark chamber, a viewing chamber, an ocular finder lens disposed at the rear of said viewing chamber, an objective finder lens, said objective lens comprising two plano concave elements disposed in line with said ocular lens at the front of said viewing chamber with their concave sides relatively adjacent and spaced from each other, a revoluble iris plate disposed upon the front of said casing, said iris plate having a series of light-admitting openings of different sizes which upon the rotation of said plate are disposed in alignment with said photographic lens, a series of light-modifying instrumentalities of an extinction photometric type each corresponding to one of said light-admitting openings, said iris plate being so mounted and said instrumentalities being so disposed on said plate that the rotation of said iris plate successively brings the one thereof corresponding to the light-admitting opening then in alignment with said photographic lens within said viewing chamber between said elements of said objective lens and into alignment with said ocular lens.

38. In a camera, an outer enclosing casing, a dark chamber within said casing, a photographic lens disposed at the forward side of said dark chamber, a viewing chamber, an ocular finder lens, and an objective finder lens, said objective lens comprising two plano concave elements disposed at the front end of said viewing chamber with their concave sides relatively adjacent and spaced from each other, said ocular lens being disposed at the rear of said viewing chamber and in alignment with said objective finder lens, a revoluble iris plate disposed adjacent the front of said casing, said iris plate having a series of light-admitting openings of different sizes which upon the rotation of said plate are disposed in alignment with said photographic lens, a series of signals each corresponding to one of said light-admitting openings and being so disposed in relation to said openings that it indicates the one thereof then in position opposite said photographic lens, said plate being so mounted that its rotation brings each of said signals successively within said viewing chamber between said elements of said objective lens thus indicating the one of said light-admitting openings then effective upon the film.

39. In a camera, a photographic lens, a viewing chamber, an ocular lens at the rear of said viewing chamber, two plano concave lenses spaced from each other at the front of said chamber, the concave sides of said last mentioned lenses facing each other, all of said lenses being so placed that the focus of said ocular lens is between said concave sides of the lenses at the front of said chamber, and indicia to be seen by a user of the camera disposed in the space between said lenses and in said focus.

40. In a camera, a photographic lens, a viewing chamber, an ocular lens at the rear of said viewing chamber, and two plano concave lenses spaced from each other at the front of said chamber, the concave sides of said last mentioned lenses facing each other, all of said lenses being so placed that the focus of said ocular lens is in the space between said concave sides of said lenses in the front of said chamber, a plurality of movable indicia mounted in the space between said concave sides and in said focus, and means for moving said indicia so that a selected one thereof is seen in said focus.

41. In a camera, a photographic chamber, a viewing chamber disposed above and in line with said photographic chamber, a photographic lens disposed at the front of said photographic chamber, two plano-concave finder lenses spaced from each other at the front of said viewing chamber, an ocular finder lens disposed at the rear of said viewing chamber, the concave sides of said plano-concave lenses facing each other, all of said lenses being so placed that the focus of said ocular lens lies in the space between said concave sides of said lenses at the front of said chamber, an iris disposed in horizontal alignment with said photographic lens and operable to change the effective aperture of said photographic lens, and indicia carrying instrumentalities extending from said iris into the space between said concave sides of said finder lenses at the front of said viewing chamber whereby when said iris is operated to change the opening of said lens said indicia are likewise moved and visible in the focus of said finder ocular lens to a person who looks therethrough.

42. Apparatus according to claim 41, including a mask applied to and aligned with said plano-concave lenses which includes a central frame defining the field of view of said photographic lens, a transparent colored light-filtering border around said frame outside of the field of view of said photographic lens and adjacent thereto through which a user can see the portion of a scene surrounding said field of view, said transparent light-filtering border setting apart all of the adjacent border of the scene by the difference in color of the field of said border and such frame defining the field of the photographic lens as he also views said indicia indicating said iris opening.

43. In a camera, a photographic lens and a finder or viewing system, said system including a mask with a central transparent frame defining the field of view of said photographic lens and a transparent colored light-filtering border for said frame through which a user of a camera can look to see the portion of a scene adjacent and surrounding said field of view, said border having light-transmitting characteristics which act as an extinction photometer and further aid a user of a camera in his composition of a picture about to be taken by showing the area surrounding said field.

44. In a camera, an outer enclosing casing, a dark chamber within said casing, a photographic lens at the forward end of said dark chamber, means for applying to said photographic lens apertures of different openings, a finder lens or viewing system, said system comprising a viewing chamber, an ocular finder lens disposed at the rearward end of said finder chamber and an objective finder lens disposed at the forward end of said viewing chamber, and a plurality of transparent masks associated with said objective lens at the forward end of said finder chamber, one of said masks having a central frame bounding the field of view of said photographic lens and a colored and transparent border surrounding at least a major portion of said transparent central portion which shows and sets apart the portion of a scene adjacent said field of view by the difference in color between said field and said border thereby aiding a photographer in the composition of a picture, and another of said masks having a transparent photometric sheet visible through said finder lens and also outside of the field of view of said photographic lens and adjacent to and separate from the colored finder of said first mask, said sheet being translucent and of a density corresponding to and representing the photographic effectiveness of one of the apertures of said photographic lens thereby to act as an extinction photometer so that a user of the camera can determine the light value of the particular aperture then effective upon said photographic lens.

45. A device according to claim 44, including means for changing the aperture of said photographic lens and wherein said first mentioned transparent border is characterized by a density different from that of said second mentioned mask and appropriate to another one of said lens apertures so that the user can also employ it as an extinction photometer applying to the light effective through said last mentioned aperture.

46. In a camera, a photographic lens, an iris plate for said lens, said iris plate including a plurality of different sized light-admitting openings movable into alignment with said photographic lens, a view finder mask providing a central transparent portion representing the field of view of the camera and a cut-out area adjacent thereto, signals mounted upon said iris plate and so disposed that the movement of said iris plate moves the one of said signals appropriate to the opening then in alignment with the photographic lens in alignment with said cut-out opening, such signal thereby appearing only in said cut-out portion and hence not interfering with the clear delimitation of the field of a picture about to be taken.

47. In a camera, a photographic lens, iris means for enlarging and diminishing the opening of said lens whereby more or less light passes through said lens, a viewing chamber, said chamber including an area representing the field of view of the camera and a cut-out signalling portion, a translucent colored border surrounding at least a portion of said area which assists a user of the camera in composing of photograph to be taken, said cut-out signalling portion being disposed outside of said area and of said border signals each representing a particular opening effective upon the lens, and a connection between said signals and said iris means for moving said signals into and out of alignment with said cut-out portion whereby the user may readily determine as he composes a picture what opening is then effective upon the lens, such signal not interfering with the field of view representing the picture to be taken or with the border.

48. In a camera, a photographic lens, an iris plate for said lens, said iris plate including a plurality of openings movable into alignment with said photographic lens to change the amount of light passing therethrough, a view finder mask having a central transparent portion representing the field of view of the camera and a cut-out area adjacent thereto, and cut-out numerals representing the value of each of said iris openings mounted upon said iris plate and so disposed that the movement of said iris plate moves the one of said numerals appropriate to the opening then in alignment with the photographic lens in alignment with said cut-out opening, such numeral thereupon appearing only in said cut-out portion.

49. In a camera, a photographic lens, a movable iris plate, said plate having a plurality of light-admitting openings disposed in one portion of said plate for alignment with said photographic lens upon the movement of said iris plate whereby the amount of light passing through said lens is changed, a view finder lens, signals disposed upon said plate corresponding to said light-admitting openings, the movement of said iris plate to bring any predetermined opening in alignment with said photographic lens being effective to bring a corresponding signal within the field of view of said finder lens, said signals comprising tabs cut in a portion of said plate spaced from said first mentioned portion, said tabs being so arranged that for each light-admitting opening a tab occupies a different position in relating to said finder lens thereby indicating to a user which one of said openings is currently in alignment with said photographic lens.

50. In a camera, a photographic lens, an iris plate, said plate having a plurality of openings disposed in one portion of said plate for alignment with said photographic lens upon the movement of said iris plate whereby the amount of light passing through said lens is changed, a view finder system, said system comprising at least one view finder lens, a mask having an opening aligned with said lens delimiting the field of view of said photographic lens, a cut-out space in said mask adjacent but spaced from said opening, signals disposed upon said iris plate corresponding to said openings, the movement of said iris plate to bring any predetermined opening in alignment with said photographic lens being effective to bring a corresponding signal within the field of said cut-out portion of said mask, said signals comprising tabs carried by a portion of said iris plate spaced from said first-mentioned portion thereof, said tabs being so arranged that for each predetermined photographic opening said tab occupies one side of said cut-out space and for another opening occupies another side of said space and for still another opening is moved clear of said cut-out.

51. In a camera, a casing, said casing having a front wall and a back wall and side and top and bottom walls joining said front and back walls, said front wall having a forwardly projecting relatively narrow rigid extension with an aperture in the forward portion thereof, a lens disposed adjacent said aperture and in alignment therewith, protuberances upon vertical axes being formed adjacent each point of junction between said side and back walls, the relatively rearward and laterally extending portions of said front wall being disposed relatively close to said back wall, protuberances upon vertical axes in said front wall opposite said protuberances in said back wall, said protuberances which are oppositely disposed adjacent the same side wall being of such size and shape and distance from the other of the same pair that they can readily and firmly be grasped by the fingers and thumb of one hand of a user, an operable shutter including at least one resilient blade aligned with said lens and said aperture for alternatively opening and closing said aperture, means for directing said resilient blade between a position in a plane substantially normal to the optical axis of said lens in said rigid extension generally parallel to said front wall and a position generally parallel to one of the walls substantially at right angles to said plane, mechanism for operating said shutter disposed in said plane normal to said optical axis, a control button for said shutter operating mechanism disposed upon one of said relatively rearward and laterally extending portions of said front wall adjacent one of said protuberances, and linkage connecting said shutter operating mechanism and said button for operating said shutter upon the movement of said button, whereby the user may firmly hold the camera and make an exposure without obscuring the lens by a portion of a hand with which he operates the camera.

52. In a camera, a casing, said casing having walls forming an enclosure which is generally T-shaped in top plan, an aperture being formed in a front of said walls which represents the bottom of the leg of the T, a lens disposed adjacent said aperture and in alignment therewith, pairs of protuberances upon vertical axes upon the ends of the cross bar of the T on each side thereof, said protuberances of each pair being of such size and shape and distance from the other that they can readily and firmly be grasped by the fingers and thumb of one hand of a user, an operable shutter, said shutter including at least one light-obscuring element aligned with said lens and said aperture and operable in a first plane normal to the optical axis of said lens for alternatively opening and closing said aperture, a resilient connecting element extending in an arc from said light-obscuring element to a position in a second plane disposed at a substantial angle to said first plane and parallel to one of said walls other than said front wall, mechanism for operating said shutter disposed in said second plane, a control button for said shutter disposed adjacent one of said protuberances and so positioned as to be operable by a finger of a hand of a user by which he grasps said protuberance, and a connection between said resilient element and said button for operating said shutter upon the movement of said button, whereby the user may firmly hold the camera and make an exposure without obscuring the lens by a portion of the hand with which he operates the camera.

53. In a camera, a casing, said casing having walls forming an enclosure which is generally T-shaped in top plan, an aperture being formed in a front of said walls which represents the bottom of the leg of the T, a lens disposed adjacent said aperture and in alignment therewith, an operable shutter including at least one resilient element aligned with said lens and said aperture and operable in a first plane normal to the optical axis of said lens for alternatively opening and closing said aperture, means for directing said resilient element between a position in said first plane and a position in another or second plane generally parallel to another of said walls and at a substantial angle to said first plane, a control button for said shutter disposed upon a front portion of the cross bar of the T, and shutter operating mechanism connecting said shutter and said button for operating said shutter on the movement of said button, said mechanism being disposed in said second plane, whereby a user may firmly hold the camera and make an exposure without obscuring the lens by a portion of a hand with which he operates the camera.

54. In a camera, a casing, said casing having a front wall and a back wall and side and top and bottom walls joining said front and back walls, an aperture being formed in said front wall, a lens disposed adjacent said aperture and in alignment therewith, protuberances upon vertical axes being formed adjacent each point of junction between said side and back walls, relatively rearward and laterally extending portions of said front wall being disposed relatively close to said back wall, protuberances upon vertical axes being formed in said front wall opposite said protuberances in said back wall, said protuberances which are oppositely disposed adjacent the same side wall being of such size and shape and distance from the other of the same pair that they can readily and firmly be grasped by the fingers and thumb of one hand of a user, an operable shutter aligned with said lens and said aperture for alternatively opening and closing said aperture, said shutter including at least one resilient element, means for directing said resilient element between a position in a plane normal to the optical axis of said lens generally parallel to said front wall and a position generally parallel to another of said walls at a substantial angle to said plane, a control button for said shutter disposed adjacent one of said protuberances, and a connection between said resilient element and said button for operating said shutter upon the movement of said button, the position of said button in relation to the adjacent pair of protuberances being such that it may be operated by a finger of a hand of the user which grasps said protuberances to hold the camera.

55. In a camera, a casing having a bottom wall and a top wall and a front panel; a multi-purposed irregularly shaped integral interior-exterior plate; said plate extending within said camera from the plane of the front thereof backwardly to the rear of said camera and extending at substantially a right angle to said interior portion to form an exterior back wall portion, said multi-purposed plate extending forwardly from said back wall portion to form exterior side wall portions, each of said side wall portions at the frontward ends thereof having inwardly extending oppositely disposed surfaces generally parallel to said back wall portion, pairs of oppositely disposed protuberances being disposed upon vertical axes in said surfaces and said back wall portions respectively of said plate, each member of each of said pairs being sufficiently close to the other member thereof that they can be firmly grasped by fingers and a thumb of a hand of a user, said surfaces extending further forwardly at substantially right angles and generally parallel to said side wall portions, said casing therefore being T-shaped in top plan, cooperating formations upon the portions of said plate representing the leg of the T and upon said panel whereby said panel is engaged to complete a closure for the front of said casing, and means for rigidly fastening said top and bottom walls to said multi-purposed plate whereby said casing is completed.

56. In a camera having a casing, a multi-purposed irregularly shaped integral interior-exterior plate; said plate having an interior portion within said casing extending from the plane of the front thereof backwardly to the rear of said camera and extending therewithout to form an exterior back wall portion, said plate extending forwardly from said back wall portion to form exterior side wall portions, each of said side wall portions at the forward ends thereof having inwardly extending oppositely disposed surfaces which form at least a portion of the front wall of said camera, said surfaces and said back wall portion being generally parallel, said plate also having pairs of oppositely disposed protuberances upon vertical axes in said surfaces and back wall portions respectively, each member of each pair being sufficiently close to the other member thereof that they can be firmly grasped by fingers and the thumb of a user, and closure means engageable with said multi-purposed plate for completing said casing.

57. In a camera, a casing which in top plan resembles a T, a multi-purposed irregularly shaped integral interior-exterior plate, said plate having an interior portion within said camera extending from the plane of the front thereof backwardly to the rear of said camera within the leg and cross bar of the T and extending at substantially a right angle to said interior portion to form an exterior back wall portion, said multi-purposed plate extending forwardly from said back wall portion to form exterior side wall portions, each of said side wall portions extending inwardly to form a portion of a front wall of the camera parallel to said back wall, said inwardly extending portions representing the lower portions of the cross bar of the T, said multi-purposed plate extending therefrom forwardly into engagement with the front portion of said plate as aforesaid thereby forming the sides of the leg of the T, operable portions of said camera being mounted upon said interior portion of said plate, and closure means for completing the top and bottom and front of said casing.

58. In a camera, said camera having a bottom wall, a top wall, and a multi-purposed irregularly shaped integral interior-exterior plate; said multi-purposed integral plate having a horizontal portion within said camera which forms a common wall serving as the top of a dark chamber and the bottom of a viewing chamber, a back wall portion extending above and below said common wall, and side wall portions extending forwardly from said back wall portion, each of said side wall portions having inwardly extending oppositely disposed surfaces which form a portion of a front wall of the camera, said back wall portions and said inwardly extending formations surfaces being substantially parallel and having pairs of protuberances upon vertical axes whereby said camera can be firmly grasped; a closure for completing said front wall, and means for rigidly fastening said top and bottom walls to said multi-purposed plate whereby said camera casing is completed.

59. In a camera, a casing comprising a bottom wall, a multi-purposed irregularly shaped interior-exterior plate, a front panel, and a top wall; said multi-purposed plate having a vertical front portion with an opening for the reception of said front panel and a formation engageable with the front of said bottom wall, said plate thence extending horizontally backwardly within the interior of the casing and thence vertically upwardly to form a front portion of a dark chamber and thence horizontally backwardly as a common wall which forms the top of said dark chamber and the bottom of a viewing chamber and thence vertically upwardly into contact with a rear portion of said top wall and also vertically downwardly to a junction with a rear portion of said bottom wall, said multi-purposed plate thereby providing the exterior back wall of said camera, said plate thereupon extending forwardly upon each vertical end of said bottom wall to form side walls and at the front of said side walls so formed uniting with said vertical front portion thereof, the bottom of said vertical front portion engaging a front edge of said bottom wall, said side walls of said multi-purposed plate being enlarged adjacent said back wall to form pairs of front and back oppositely disposed protuberances upon vertical axes sufficiently close to each other to be firmly grasped by a thumb and fingers of one hand of a user, said top wall extending horizontally backwardly from said front panel to a point of junction with a top and back portion of said multi-purposed wall, said top wall thereby cooperating with said front panel and said plate to complete said viewing chamber; the bottom of said front panel and the vertical front portion of said multi-purposed plate and the top of said panel and the front of said top wall having cooperating formations which upon engagement complete the positioning of the members of said casing; and means for rigidly fastening said top and bottom walls to the remainder of said casing.

60. In a camera, a casing having a multi-purposed irregularly shaped interior-exterior plate and a bottom wall and a top wall; said multi-purposed plate having a portion which extends horizontally backwardly within the interior of the camera from a plane adjacent the front thereof and forms a common wall which serves as the top of a dark chamber and the bottom of a viewing chamber and thence extends vertically upwardly into contact with a rear portion of said top wall and also vertically downwardly into contact with a rear portion of said bottom wall, said multi-purposed plate thereby providing the exterior back wall of said camera, said plate thence extending forwardly upon each side of said bottom wall to form exterior side walls, said side walls of said multi-purposed plate being enlarged adjacent said back wall to form pairs of front and back oppositely disposed protuberances upon vertical axes sufficiently close to each other to be firmly grasped by a thumb and finger of one hand of the user, said side walls extending inwardly and then again forwardly from the inward vertical portion of each of said protuberances thereby giving to said camera a T-formation as seen in top plan, said top wall extending horizontally backwardly from the top of said front wall to a junction with a top of the back portion of said multi-purposed wall; means for rigidly fastening said top and bottom walls to said multi-purposed plate, and means completing the closure of the front of said casing.

61. In a camera, a casing having a bottom wall, a multi-purposed irregularly shaped interior-exterior plate, and a top wall; said multi-purposed plate having a portion which extends horizontally backwardly from a forward portion to form a common wall which serves as the top of a dark chamber and the bottom of a viewing chamber and thence extends vertically upwardly into contact with the rear portion of said top wall and vertically downwardly into contact with the rear portion of said bottom wall, said multi-purposed plate thereby providing the exterior back wall of said camera, said plate therefrom extending forwardly upon each vertical end of said bottom wall to form exterior side walls, said exterior walls of said multi-purposed plate adjacent each outside end of said casing being enlarged adjacent said back wall portion to form pairs of front and back oppositely disposed protuberances upon vertical axes sufficiently close to each other to be firmly grasped by a thumb and fingers of one hand of a user, means attached to and extending downwardly from said horizontal interior portion of said multi-purposed plate for maintaining a roll of film in the interior of each of the protuberances so formed, said top wall extending horizontally backwardly from said front panel to a point of junction with a top and back portion of said multi-purposed wall, said top wall thereby cooperating with said closure means and said plate to complete said viewing chamber; means completing the closure of the front of said housing and means for detachably securing said bottom wall to the remainder of said casing whereby access may be had to said rolls of film.

62. In a camera, an outer walled casing having a bottom wall, a multi-purposed irregularly shaped interior-exterior plate, and a top wall; said multi-purposed plate having a portion which extends horizontally backwardly from a forward portion and thence extends vertically upwardly into contact with the rear portion of said top wall and vertically downwardly into contact with the rear portion of said bottom wall, said multi-purposed plate thereby providing the exterior back wall of said camera, said plate therefrom extending first forwardly upon each vertical end of said bottom wall to form a portion of exterior side walls and thence extending inwardly and thence extending forwardly and uniting with said previously mentioned forward horizontal portion thereof, said exterior walls together thus forming a partial enclosure which is generally T-shaped in top plan, means for completing said enclosure, protuberances upon vertical axes being formed adjacent each point of junction between said side and back walls, the relatively rearward and laterally extending portions of said front wall being disposed relatively close to said back wall, protuberances upon vertical axes being formed in said inwardly extending portion of said wall opposite said protuberances in said back wall, said protuberances being adjacent the ends of the cross bar of the T and those which are oppositely disposed adjacent the same side wall being of such size and shape that they can be readily and firmly grasped by fingers and a thumb of one hand of a user, said interior horizontal portion of said plate forming a partition generally parallel to said top and bottom walls and extending from a forward position in the leg of the T backwardly into the cross bar thereof, a dark chamber thus being formed below said partition and an operating chamber thus being formed thereabove, means below and supported by said partition and within the cross-sectional area of one of said oppositely disposed pairs of protuberances for positioning a delivery spool of film, means within the cross-sectional area of the other of said oppositely disposed pairs of protuberances for supporting a take-up spool of the film, said spools being disposed between said partition and said bottom wall, means for detachably securing said bottom wall to the remainder of said casing, the film passing between said spools over the rearward end of said dark chamber and being accessible when said bottom wall is removed; said front wall being formed with an aperture, a lens in alignment with said aperture, a shutter for said lens, re-settable mechanism for operating said shutter disposed upon the upper side of said partition, a control button for said shutter disposed upon one of said relatively rearward and laterally extending portions of said front wall in the cross bar of the T and adjacent one of said protuberances, a connection between said button and said shutter-operating mechanism, take-up mechanism within said cross bar with an operative element thereof mounted upon the upper surface of said partition and adjacent an end of said cross bar for operating said take-up spool, and a connection between said mechanism for re-setting said shutter and said operative element for re-setting said shutter mechanism upon the operation of said take-up mechanism.

63. In a camera, a casing which is generally T-shaped in top plan, a dark chamber and a viewing chamber within said casing, said viewing chamber extending from back to front of said camera, a common interior horizontal wall separating said chambers and extending from the leg of the T into the cross bar thereof, means for supporting a delivery roll of film within the cross bar of the T below said common wall and adjacent an outer end of said cross bar, means for supporting a take-up spool for the film adjacent the other end of said cross bar of the T, a photographic lens at the front of said dark chamber, an ocular finder lens at the rear of said viewing member and an objective finder lens at the front of said viewing chamber, said finder lenses being in alignment, a shutter at the front of said dark chamber to cooperate with said photographic lens, re-settable mechanism for operating said shutter assembled upon the top of said common wall within said viewing chamber, said mechanism being mounted out of the line of sight between said finder lenses, a control button adjacent one end of the cross bar of the T, mechanism for winding up the film, said mechanism being disposed in part in said viewing chamber out of said line of sight, and a connection between said winding up mechanism and said shutter operating mechanism for re-setting said shutter mechanism by the operation of said winding-up mechanism.

64. In a camera; a multi-purposed irregularly shaped interior-exterior plate, a front panel, and a top wall; said multi-purposed plate being formed with a vertical forward portion with an opening for the reception of said front panel and thence projecting horizontally backwardly from the lower part of said forward portion within the interior of the camera and thence vertically upwardly to form a front portion of a dark chamber and thence horizontally backwardly as a common wall which forms the top of said dark chamber and the bottom of a viewing chamber and thence vertically upwardly into contact with a rear portion of said top wall and also vertically downwardly to form a rear portion of said bottom wall, said multi-purposed plate thereby providing the back wall of said camera, said plate thereupon extending forwardly upon each vertical end of said bottom wall to form side walls and at the front of said side walls so formed uniting with said forward portion thereof, the placing of said front panel in said opening thereby completing the front of said camera, said top wall extending horizontally backwardly from said front panel to a point of junction with a top and back portion of said multi-purposed wall, said top wall thereby cooperating with said front panel and said plate to form a view finder chamber; and a bottom wall.

65. In a camera having operable parts, a casing; said casing comprising a bottom wall, a multi-purposed interior-exterior plate, a top wall, and a front panel; said multi-purposed plate having a (first) front vertically upstanding portion with an opening for the reception of said front panel, a (second) portion extending backwardly from the bottom of said first portion toward the interior of said casing, a (third) vertical inward portion extending upwardly thence, a (fourth) portion thence extending horizontally backwardly to the rear of the camera, a (fifth) portion extending vertically upwardly and vertically downwardly to form the rear exterior wall of the camera; said bottom wall extending between said (first) up-standing forward portion of said multi-purposed plate and the bottom of said (fifth) downwardly extending rear wall portion of said plate, adjacent surfaces of the bottom of said first and fifth portions of said multi-purposed plate and front and back edges of said bottom wall respectively having cooperating formations which join said plate and said wall when they are brought into engagement and the top of said front panel and the front of said top wall having formations adapted to engage when they are brought together, said top wall extending from said junction with said front panel to its junction with said upwardly extending vertical part of said (fifth) portion of said interior wall, means for rigidly attaching said bottom and top walls to said plate after said formations have been brought together, such construction thereby forming an operating chamber extending throughout said casing from front to rear; operating mechanism for operable parts of said camera being disposed in said operating chamber.

66. In a camera, an outer enclosing casing, a horizontal common wall within said casing forming the top of a dark chamber and the bottom of a viewing chamber, means for supporting a film at the rear of said dark chamber, film moving means, a lens for focusing an image upon the film, a shutter disposed adjacent the front of said casing for opening and closing said lens thereby making an exposure, an ocular viewing lens disposed at the rear of said viewing chamber and an objective viewing lens disposed at the front thereof, said viewing lenses being in alignment, mechanism for operating said shutter, said mechanism being adapted for assembly upon the top of said dark chamber and spaced from said top wall and out of the line of sight between said viewing lenses, a connection between said mechanism and said shutter, a control member on the exterior of said casing for operating said mechanism, and a cover for completing the enclosure of said casing after said mechanism has been assembled on said common wall.

67. In a camera, a casing, a dark chamber and a viewing chamber within said casing, said viewing chamber extending from back to front of said casing, a common interior horizontal wall separating said chambers, means for supporting a delivery roll of film below said common wall, means for supporting a take-up spool for the film below said common wall, the film passing from said delivery to said take-up roll across the rear end of said dark chamber, a photographic lens at the front of said dark chamber, an ocular finder lens disposed at the rear of said viewing chamber and an objective finder lens disposed at the front of said viewing chamber, said finder lenses being in alignment, a shutter disposed at the front of said dark chamber to cooperate with said photographic lens, re-settable mechanism for operating said shutter assembled upon the top of said common wall within said viewing chamber, said mechanism being mounted out of a line of sight between said finder lenses, said shutter and said mechanism being operatively connected, and mechanism for winding up the film, said mechanism being disposed in part in said viewing chamber out of said line of sight, and a connection disposed within said viewing chamber between said mechanisms for re-setting said shutter operating mechanism by the operation of said winding up mechanism.

68. In a camera, a casing, a cover for said casing, said cover having a rear depending flange, a front panel for said casing, a dark chamber and a viewing chamber within said camera, said viewing chamber extending from back to front of said camera, a common interior horizontal wall separating said chambers, means for supporting a delivery roll of film below said common wall, means for supporting a take-up spool for the film below said common wall, the film passing from said delivery to said take-up roll across the rear of said dark chamber, a photographic lens at the front of said dark chamber, an ocular finder lens mounted in said flange of said cover and at the rear of said viewing chamber after said cover has been joined to the remainder of said casing, an objective finder lens disposed in said front panel in such position that when said cover and said panel are assembled with the remainder of said casing said finder lenses are in alignment, a shutter at the front of said dark chamber to cooperate with said photographic lens, re-settable mechanism for operating said shutter, said mechanism being adapted to be assembled upon the top of said common wall within said viewing chamber before said cover is assembled with said casing, said mechanism being mounted out of the line of sight between said finder lenses after such assembly, said shutter and said mechanism being operatively connected, and means for completing the enclosure of said casing.

69. In a camera having a casing, an aperture, a lens aligned with said aperture, a shutter for alternatively opening and closing said aperture, and mechanism for operating said shutter; a multi-purposed irregularly shaped integral interior-exterior plate; said multi-purposed integral plate having a portion within said casing extending from the front to the back thereof, said shutter-operating mechanism being mounted upon said interior portion of said plate, said plate at the back thereof extending at an angle from said interior portion to form the exterior back wall of said casing, said back wall portion of said plate thence extending forwardly upon each edge thereof to form parallel exterior portions of said casing, each of said last mentioned wall portions having inwardly extending oppositely disposed surfaces which form at least a portion of a front wall of the casing; and closure means for completing said casing.

70. In a camera having an outer casing, an aperture, a lens aligned with said aperture, a shutter for alternatively opening and closing said aperture, and mechanism for operating said shutter; a multi-purposed irregularly shaped integral interior-exterior plate; said multi-purposed integral plate having a portion within said casing extending from the front to the back thereof and thence extending at an angle to form the portion of said casing which is the exterior back wall, parallel portions of said multi-purposed plate thence extending forwardly to form parallel walls of the casing and thence inwardly to form at least a portion of a front wall of said casing; said mechanism for operating said shutter being disposed upon said interior portion of said plate, said interior portion being provided with an angularly off-set portion, said shutter being mounted upon said angularly off-set portion, a connection between said shutter and said operating mechanism likewise mounted upon said interior portion of said plate; a control button for said shutter mounted upon the exterior of said casing, and a connection between said control button and said shutter-operating mechanism.

71. In a camera, a casing, said casing including a vertical front wall and enclosing walls, said vertical wall having an exposure aperture, a photographic lens supported by said casing and aligned with said aperture in said vertical wall, a film delivery support and a film take-up support within said casing with axes generally parallel to said vertical wall and so disposed that the film passing therebetween moves across said aperture, at least one flexible photographic exposure shutter blade having a light-controlling end movable from and to a position opposite said lens in the plane of said vertical wall alternatively to make an exposure upon the film and to prevent light from reaching it, operating mechanism for said shutter blade within said camera, said operating mechanism having a motion-transmitting connection with said shutter blade disposed to operate in a plane at a substantial angle to that of said vertical front wall, and a curved guideway for directing said shutter blade in an arc between the plane of said aperture and the plane in which said connection operates as it is pushed and pulled by said connection in relation to said aperture and lens, said blade being of sufficient resilience to be so pushed and pulled.

72. In a camera, an enclosure having an aperture in one or a first plane, a photographic lens supported by said enclosure in line with said aperture, a support in another or a second plane, a flexible exposing shutter blade having a light-controlling end disposable and operative in said first plane and an operating end disposed and operated in said second plane, a cover-up resilient shutter blade having a blocking end disposed and operative in said first plane and an operating end disposed and operated in said second plane, shutter operating mechanism upon said support, said mechanism including connections between said operating end of each of said blades and instrumentalities for moving said exposing blade in one direction for admitting light through said aperture and lens and thereafter blocking said aperture and lens and alternatively for moving said blade in the opposite direction for re-setting said exposing blade between each of said exposing operations and also for operating said cover-up blade to cover up said aperture during said re-setting operation of said exposing blade, said connections being disposed and operating in said second plane, and a curved guideway for said blades for directing them in an arc between said first and second planes, each of said blades being made of resilient material which is adapted to be alternatively operatively pushed and pulled through said curved guideway.

73. In a camera, a casing, said casing including a vertical front wall and at least one enclosing wall in a plane substantially at right angles to that of said vertical wall, said vertical wall having an exposure aperture, a photographic lens supported by said casing and aligned with said aperture in said vertical wall, a film delivery support and a film take-up support within said casing with axes generally parallel to said vertical wall and so disposed that the film passing therebetween moves across said aperture, a shutter, said shutter including a flexible photographic exposure shutter blade having a light-controlling end having a light-admitting opening with a lower opaque or cover-up portion above said opening and an upper opaque or cover-up portion below said opening, said blade being movable in the plane of said vertical wall, such movement in an upward direction moving said upper cover-up portion upwardly from a position opposite said aperture and said light-admitting opening across said aperture thereby making an exposure and said lower cover-up portion opposite said aperture thereby protecting said exposed portion of the film, operating mechanism for said shutter blade within said camera, said operating mechanism having a motion-transmitting connection with said shutter blade disposed to operate in a plane generally at a substantial angle to said vertical wall, said operating mechanism first pulling said shutter blade in an upward direction as aforesaid and thereafter pushing said blade in the other or downward direction to re-set the shutter, a curved guideway for directing said operating end of said shutter blade in an arc between the plane of said aperture and the plane of said connection as it is pushed and pulled by said connection in relation to said aperture and lens, said blade being of sufficient resilience to be so pushed and pulled, and means included within said shutter for covering up said aperture only while said shutter blade is being re-set.

74. In a camera, a walled dark chamber, spaced means at the rear of said dark chamber adjacent one wall for supporting a film therebetween, a vertical wall having an exposure aperture in line with said aperture, an operating chamber disposed adjacent said dark chamber, a photographic lens supported by said camera in line with said aperture, a re-settable resilient and flexible exposing shutter blade one or a light-controlling end of which upon operative movement opens and closes said aperture, a resilient and flexible cover-up shutter blade for preventing light from passing through said aperture to the film while said exposing blade is being re-set, mechanism for operating said shutter blades disposed in said operating chamber for movement in a plane substantially angular to the vertical plane in which said aperture is disposed, said mechanism including connections with the end of said exposing shutter blade relatively remote from said aperture for alternatively moving said blade in one direction through said guideway for making an exposure and in the other direction for re-setting and a connection with the end of said cover-up blade relatively remote from said aperture for moving said cover-up blade to protective position during said re-setting operation and moving said cover-up blade free of said aperture before said exposing operation, and a curved guideway for directing said shutter blades in operative movement through an arc between the vertical plane of said aperture and the different plane of said operating mechanism.

75. In a camera, an outer casing, a walled dark chamber within said casing, said dark chamber having back and front and top walls, an aperture in said front wall, a photographic lens adjacent the front wall of said chamber in line with said aperture, spaced means for supporting a delivery roll of film and a take-up roll at the back of said dark chamber in line with said aperture, a walled viewing and operating chamber disposed above and adjacent said dark chamber, an ocular lens in the back wall of said viewing chamber and objective viewing lenses in the front wall of said viewing chamber, said lenses being in horizontal alignment, a resilient picture-exposing shutter blade having a light-controlling end which alternatively opens and closes said lens, a cover-up resilient shutter blade disposed parallel to and co-operating with said picture-exposing shutter blade having a light-controlling end to cover-up said aperture while said exposure shutter blade is being re-set, shutter operating mechanism disposed in said operating and viewing chamber out of the line of sight between said finder lenses for alternatively pushing and pulling said resilient shutter blades, one of said operations making an exposure and the other re-setting said shutter, said mechanism being connected to a horizontally disposed portion of said shutter blades relatively remote from said light-controlling ends thereof, curved guide means for directing said blades from the generally horizontal plane of said operating and viewing chamber to a position in a plane generally vertical and generally parallel to said front wall of said dark chamber with said light-controlling ends in line with said photographic lens, said shutter blades thereby passing from a generally horizontal plane through an arc to a generally vertical plane adjacent the front vertical portion of said dark chamber, a blocking member extending from said shutter operating mechanism and so disposed that movement of said shutter operating mechanism to make an exposure moves it into the line of sight between said finder lenses thereby signalling the necessity of winding up the section of the film which has been exposed, means for operating said support for said take-up spool, and a connection between said shutter operating mechanism and said means for operating said take-up spool for re-setting said shutter operating mechanism upon the operation of said take-up means, such re-setting operation moving said blocking member out of said line of sight between said finder lenses.

76. In a camera, a dark chamber, said dark chamber having a vertical front wall and horizontal back and top walls, means at the rear of said dark chamber adjacent said back wall for supporting a film, means adjacent the front wall of said dark chamber and supported by said camera for mounting a photographic lens for directing an image upon the film so supported, an operating chamber with a horizontal bottom wall disposed immediately above said dark chamber, at least one resilient and flexible shutter blade having a light-controlling end for opening and closing said lens, the front and top walls of said dark chamber furnishing one part of a guideway for directing said shutter blade between a vertical plane adjacent said front wall in alignment with said lens and a horizontal plane parallel to that of said top wall of said dark chamber and that of said horizontal bottom wall of said operating chamber, a separate guide for completing said guideway disposed on the side of said flexible shutter blade opposite that which is disposed relatively adjacent said walls, said shutter blade thereby passing in an arc between a vertical plane adjacent the front vertical portion of said dark chamber and a horizontal plane adjacent the bottom wall of said operating chamber through an arc therebetween, mechanism for operating said shutter disposed in said operating chamber and connected to the end of said shutter blade relatively remote from its light-controlling end, and means accessible from the exterior of said camera for operating said mechanism.

77. In a camera, an enclosure having an aperture in one or a first plane, a photographic lens supported by said enclosure in line with said aperture, a support in another or a second plane disposed at a substantial angle to said first plane, a resilient and flexible exposing shutter blade having a light-controlling end disposed in said first plane and an operating end disposed in said second plane, a cover-up resilient shutter blade having a blocking end disposed in said first plane and an operating end disposed in said second plane, shutter operating mechanism upon said support, said mechanism including a plurality of levers and connections between said levers and the operating end of each of said blades for moving said exposing blade in one direction for admitting light through said aperture and lens and thereafter blocking said aperture and lens and alternatively for moving said blade in the opposite direction for re-seting said exposing blade between each of said exposing operations and also for operating said cover-up blade to cover up said aperture during said re-setting operation of said exposing blade, said connections and levers being disposed and operating in said second plane, and a curved guideway for said bladees, the portion of said guideway in said second plane being relatively short thereby providing for compact arrangement of said levers and the upper ends of said resilient blades which when pulled away from aperture extend substantially across said support, each of said blades being made of resilient material which is adapted to be alternatively operatively pushed and pulled through said curved guideway.

78. In a camera, an outer walled casing, a dark chamber within said casing, means at the rear of said dark chamber for supporting a film, a photographic lens adjacent the front of said dark chamber for directing an image upon the film, an operating chamber disposed adjacent said dark chamber, one wall of said dark chamber being common with one wall of said operating chamber, said common wall being generally parallel to the optical axis of said lens, at least one resilient shutter blade disposed at the front of said dark chamber for movement in a plane normal to the optical axis of said lens for opening and closing said lens, mechanism for operating said shutter, said mechanism being disposed in said operating chamber and the parts thereof being assembled upon said common wall, said blade being connected to said mechanism, a curved guideway for directing said resilient shutter blade in an arc from said common wall to said plane, and means for alternatively pushing and pulling said blade through said guideway.

79. In a camera, an enclosure having an aperture in one or a first plane, a support in another or a second plane, a resilient exposing shutter blade having an exposing end disposed in said first plane and an operating end disposed in said second plane, a cover-up resilient shutter blade having a blocking end disposed and operative in said first plane and an operating end disposed and operating in said second plane, shutter operating mechanism upon said support in said second plane, said shutter operating mechanism being attached to each of said blades and having instrumentalities for moving said first blade to expose said aperture and thereafter to block said aperture and to reset said exposing blade between said exposing and blocking operations and also having instrumentalities for operating said cover-up blade to cover up said aperture during said re-setting operation of said exposing blade, and a separate curved guideway for each of said blades for directing it between said first and second planes independently one of the other, each of said blades being made of resilient material which is adapted to be alternatively operatively pushed and pulled through said guideways.

80. In a camera, an outer casing, a dark chamber within said casing, said dark chamber having back and front and top walls, a photographic lens adjacent said front wall, a viewing chamber disposed immediately above said dark chamber, the top wall of said dark chamber serving as the bottom wall of said operating chamber, an ocular viewing lens in the back wall of said viewing chamber and an objective viewing lens in the front wall of said viewing chamber, said lenses being in alignment, at least one resilient shutter blade having a light-obscuring end which alternatively opens and closes said photographic lens, means for directing said blade from the generally horizontal plane of said common wall to a position in a plane generally vertical and generally parallel to said front wall of said dark chamber with said light-obscuring end in line with said photographic lens and intersecting its principal axis, said shutter blade thereby passing from a generally horizontal plane adjacent said common wall through an arc to a generally vertical plane adjacent the front vertical portion of said dark chamber, re-settable mechanism for operating said shutter disposed on the top of said common wall and the parts thereof being assembled thereupon out of the line of sight between said finder lenses, said mechanism being connected to a horizontally disposed portion of said shutter blade relatively remote from said light-obscuring end, fixtures upon said common wall upon the lower side thereof for a delivery spool and a take-up spool of film, said fixtures being disposed each adjacent one outside edge of the rear of said dark chamber whereby the film passes thereover in line with said photographic lens, means for operating said support for said take-up spool mounted upon said common wall and adapted for assembly upon the top thereof and disposed out of the line of sight between said viewing lenses, a connection between said shutter operating mechanism and said means for operating said take-up spool for re-setting said shutter operating mechanism upon the operation of said take-up means, and a top wall for completing said viewing chamber after said parts have been assembled upon the top of said common wall.

81. In a camera, an outer casing, said casing having enclosing walls including a front panel, a photographic lens, said front panel having an opening aligned with said lens, at least one resilient shutter blade movable across said opening for opening and closing said opening, the light-obscuring and opposite ends of said blade operating in planes disposed at a substantial angle to each other and intersecting, a curved guideway for directing said blade between and within said planes, and formations upon said front panel and said walls which engage said guideway for positioning said guideway in fixed relation to said casing upon the act of assembly of said front panel with said casing.

82. In a camera, an outer enclosing casing, a front panel, said casing including a front vertical wall portion having an opening into which said panel can be inserted thereby completing said casing, side walls, an inner support having a plane portion, a photographic lens, said plane of said inner support and a plane normal to the optical axis of said lens being disposed substantially at right angles to each other, said front panel having an opening aligned with said lens, at least one resilient shutter blade movable in planes parallel to both of the said previously mentioned planes and across said opening for opening and closing said shutter, a guideway for said shutter blade, means for loosely attaching said guideway to said inner support, formations extending inwardly from each of said side walls respectively for limiting the backward movement of said guideway after such attachment, a formation upon said front panel for limiting the forward movement of said guideway, whereby the act of assembly of said front panel with said camera holds said guideway in fixed relation to said opening, and means for fixed attaching said first panel to the remainder of the casing.

83. In a camera, an exterior walled casing, a front panel, the front of said casing having an opening for the reception of said panel, a dark chamber having a generally horizontal top wall and substantially vertical front and back walls, said front wall having an aperture aligned with that of said front panel, means at the rear of said dark chamber adjacent said horizontal back wall for supporting a film, a photographic lens aligned with said apertures for directing an image upon the film, an operating chamber disposed above said dark chamber, the horizontal top wall of said dark chamber being common with the bottom wall of said operating chamber, at least one resilient shutter blade vertically disposed at the front of said dark chamber and generally parallel thereto for opening and closing said apertures, mechanism for operating said shutter blade connected to the opposite end of said blade, said mechanism being disposed in said operating chamber and the parts thereof being assembled upon said common wall, a curved guideway for directing said resilient shutter blade from the plane of said horizontal common wall to that of said vertical front wall of said dark chamber, said common wall and said guideway having cooperating formations whereby said guideway may be loosely attached to said common wall, said casing having a top wall for completing said operating chamber after the parts have been assembled thereupon, formations upon walls of said casing for holding said guideway against rearward movement, said front panel having a rearwardly positioning extension engaging said guideway for holding it against forward movement, formations upon said front panel and said casing and said top wall whereby when said front panel is put in position the enclosure of said casing is thereby completed, the assembly of said front panel with the remainder of said casing completing the positioning of said guideway, and means for fixedly attaching said top wall to the remainder of said casing.

84. In a camera having an exposure aperture, an exposure shutter blade having an aperture corresponding to the aperture of said camera with opaque portions on each side thereof, a primary pivoted lever connected to said exposing shutter blade, a cover-up shutter blade having an opaque portion for blocking said camera aperture while said exposure shutter blade is being re-set, a cover-up pivoted lever connected to said cover-up blade, said levers being disposed in adjacent parallel planes for operation therein, a toggle spring with one end connected to each of said levers respectively, successive breakings of the toggle releasing said spring to move said levers first in an exposing and then in a re-setting direction, a first and second set of blocking formations each including a member upon adjacent sides of said levers respectively and extending toward each other and so disposed that in certain portions of each cycle of movement of said levers they engage each other and block movement of said primary lever while permitting movement of said cover-up lever and thereafter are freed thereby permitting movement of said primary lever, a manually operable control member linked to said cover-up lever for moving said cover-up lever in exposing direction, the first portion of such movement bringing said blocking formations of said first set into engagement with each other for holding said primary lever and said exposing shutter blade operated thereby motionless until said cover-up blade has cleared said camera exposure aperture, further movement of said cover-up lever after said opaque portion of said cover-up shutter has cleared said aperture removing the blocking formations of said first set from engagement and breaking said toggle thereby causing said spring to move said primary lever to move said exposing aperture of said exposing blade past said camera aperture thereby making an exposure, and re-setting means operative upon said cover-up lever for moving it in the opposite or re-setting direction, the first portion of such movement bringing said second set of formations into blocking engagement with each other thereby holding said primary lever and said exposing blade motionless until said cover-up lever has moved said opaque cover-up shutter blade into blocking position across said camera aperture, further re-setting movement of said cover-up lever carrying said second set of blocking formations out of engagement with each other and breaking the toggle to render its spring operative to move said primary lever to re-set said shutter ready for another cycle of operation.

85. In a camera having an exposure aperture; a delivery support and a take-up shaft for a film and a take up control member exterior to said casing for revolving said take-up shaft to wind up the film after its exposure; an exposure shutter blade having an aperture corresponding to the aperture of said camera with opaque portions on each side thereof for exposing the film, a primary pivoted lever connected to said exposing shutter blade, a cover-up shutter blade having an opaque portion for blocking said camera aperture while said exposure shutter blade is being re-set, a cover-up pivoted lever connected to said cover-up blade, said levers being disposed in adjacent parallel planes for operation therein, a toggle spring with one end connected to each of said levers respectively, successive breakings of the toggle releasing said spring to move said levers first in an exposing and then in a re-setting direction, a first and second set of blocking formations each including a member upon adjacent sides of said levers respectively and extending toward each other and so disposed that in certain portions of each cycle of movement of said levers they engage each other and block movement of said primary lever while permitting movement of said cover-up lever and thereafter are freed thereby permitting movement of said primary lever, a manually operable control member exterior to said casing linked to said cover-up lever for moving said cover-up lever in exposing direction, the first portion of such movement bringing said blocking formations of said first set into engagement with each other for holding said primary lever and said exposing shutter blade operated thereby motion less until said cover-up blade has cleared said camera exposure aperture, further movement of said cover-up lever after said opaque portion of said cover-up shutter has cleared said aperture removing the blocking formations of said first set from engagement and breaking said toggle thereby causing said spring to move said primary lever to move said exposing aperture of said exposing blade past said camera aperture thereby making an exposure upon the film, two operating formations operatively connected to said cover-up lever, a cam, slip means for mounting said cam upon said take-up shaft, said cam and said operating formations being so disposed that when said cover-up lever is in released position revolution of said shaft brings said cam into engagement with one of said operating formations for moving said cover-up lever in an opposite or shutter-re-setting direction, the first portion of such movement bringing said second set of blocking formations into blocking engagement with each other thereby holding said primary lever and said exposing blade motionless until said cover-up lever has moved said opaque cover-up shutter blade into blocking position across said camera aperture, further re-setting movement of said cover-up lever carrying said second set of blocking formations out of engagement with each other and breaking the toggle to render its spring operative to move said primary lever to re-set said shutter ready for another cycle of operation, further rotation of said take-up shaft after said cover-up lever has been re-set bringing said cam formation into blocking engagement with said second operating formation of said cover-up lever, continued rotation of said shaft being without effect upon said shutter because of said slip mounting.

86. In a camera having a photographic lens, a viewing chamber having a transparent portion delimiting the field of the photographic lens, a translucent light filtering border surrounding said transparent central portion which shows and sets apart the portion of a scene adjacent said field of view thereby aiding a photographer in the composition of a picture to be taken, and a plurality of light screens of varying densities of an extinction photometer type mounted upon the side of said border relatively distant from said central transparent opening whereby a user of the camera may judge the light which is then available for the picture.

87. In a camera having a photographic lens and an enclosing casing with a front wall, an iris plate having a series of openings each of different diameter adapted for selective disposition in alignment with said lens for changing the amount of light admitted therethrough, a single member upon which said plate is mounted in said front wall for revolution so that said openings are successively brought before said lens, said member extending to the front portion of said front wall and having a combined handle and indicating formation extending therefrom in a plane normal to the axis of rotation of said member, indicia upon the front of said front wall indicating which of said various light-admitting openings is then in alignment with said lens, whereby said single member mounts said plate for rotation and serves as a handle member and indicates the one of said openings then in alignment with said lens.

References Cited in the file of this patent

UNITED STATES PATENTS

| | | |
|---|---|---|
| 1,200,174 | Dense et al. | Oct. 3, 1916 |
| 1,361,939 | Wallace | Dec. 14, 1920 |
| 1,897,268 | Merle | Feb. 14, 1933 |
| 1,984,544 | Pearlman | Dec. 18, 1934 |
| 2,132,715 | Wittel | Oct. 11, 1938 |
| 2,213,776 | Walter | Sept. 3, 1940 |
| 2,289,800 | Nagel | July 14, 1942 |
| 2,304,887 | Crumrine | Dec. 15, 1942 |
| 2,312,887 | Ericksson | Mar. 2, 1943 |
| 2,331,667 | Eaton | Oct. 12, 1943 |
| 2,342,509 | Gaty et al. | Feb. 22, 1944 |
| 2,352,008 | Riedel | June 20, 1944 |
| 2,464,790 | Bolsey | Mar. 22, 1949 |
| 2,487,479 | Roehrl | Nov. 8, 1949 |
| 2,502,402 | Hineline | Mar. 29, 1950 |
| 2,506,863 | Fassin | May 9, 1950 |
| 2,538,077 | Bloose | Jan. 11, 1951 |
| 2,548,529 | Harvey | Apr. 10, 1951 |

FOREIGN PATENTS

| | | |
|---|---|---|
| 9,382 | France | Oct. 12, 1908 |
| 446,656 | Great Britain | May 4, 1936 |
| 997,899 | France | Sept. 19, 1951 |